US011068776B2

(12) United States Patent
Kato et al.

(10) Patent No.: US 11,068,776 B2
(45) Date of Patent: Jul. 20, 2021

(54) CONVOLUTIONAL NEURAL NETWORK BASED DATA PROCESSING APPARATUS, METHOD FOR CONTROLLING THE SAME, AND STORAGE MEDIUM STORING PROGRAM

(71) Applicant: CANON KABUSHIKI KAISHA, Tokyo (JP)

(72) Inventors: Masami Kato, Sagamihara (JP); Takahisa Yamamoto, Kawasaki (JP); Osamu Nomura, Yokohama (JP); Yoshinori Ito, Tokyo (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/783,792

(22) Filed: Feb. 6, 2020

(65) Prior Publication Data
US 2020/0175358 A1 Jun. 4, 2020

Related U.S. Application Data

(63) Continuation of application No. 15/791,223, filed on Oct. 23, 2017, now Pat. No. 10,586,149.

(30) Foreign Application Priority Data

Oct. 28, 2016 (JP) .................................. 2016-211897

(51) Int. Cl.
*G06N 3/063* (2006.01)
*G06K 9/46* (2006.01)
(Continued)

(52) U.S. Cl.
CPC ......... *G06N 3/063* (2013.01); *G06F 15/7867* (2013.01); *G06K 9/00986* (2013.01);
(Continued)

(58) Field of Classification Search
CPC ...... G06N 3/0454; G06N 3/10; G06K 9/6807; G06K 9/00409; G06F 15/7867
See application file for complete search history.

(56) References Cited

FOREIGN PATENT DOCUMENTS

JP 2003009125 A 1/2003

OTHER PUBLICATIONS

Koto Ando, et al., Dataflow Reconfigurable Arithmetic Array Architecture for Deep Convolutional Neural Network, IEICE Technical Report, The Institute of Electronics, Information and Communication Engineers (IEICE), Jul. 2016, 11 pages, vol. 116, No. 53.

*Primary Examiner* — Ajay Ojha
(74) *Attorney, Agent, or Firm* — Canon U.S.A., Inc. IP Division

(57) ABSTRACT

A data processing apparatus includes a storage unit configured to store reference data of a filter operation and coefficient data of filters, a plurality of operators configured to parallelly perform the filter operation on the reference data and the coefficient data of the filters, a first supply unit configured to supply reference data transferred from the storage unit to the plurality of operators, a second supply unit configured to supply coefficient data of a first and second filters transferred from the storage unit to the plurality of operators, and a control unit configured to control the second supply unit to supply the coefficient data of the first filter to a first operator, and supply the coefficient data of the second filter to a second operator.

16 Claims, 17 Drawing Sheets

(51) Int. Cl.
*G06K 9/00* (2006.01)
*G06F 15/78* (2006.01)
*G06K 9/68* (2006.01)
*G06N 3/04* (2006.01)
*G06N 3/10* (2006.01)

(52) U.S. Cl.
CPC ......... *G06K 9/4628* (2013.01); *G06K 9/6807* (2013.01); *G06N 3/0454* (2013.01); *G06N 3/10* (2013.01); *G06K 9/00409* (2013.01)

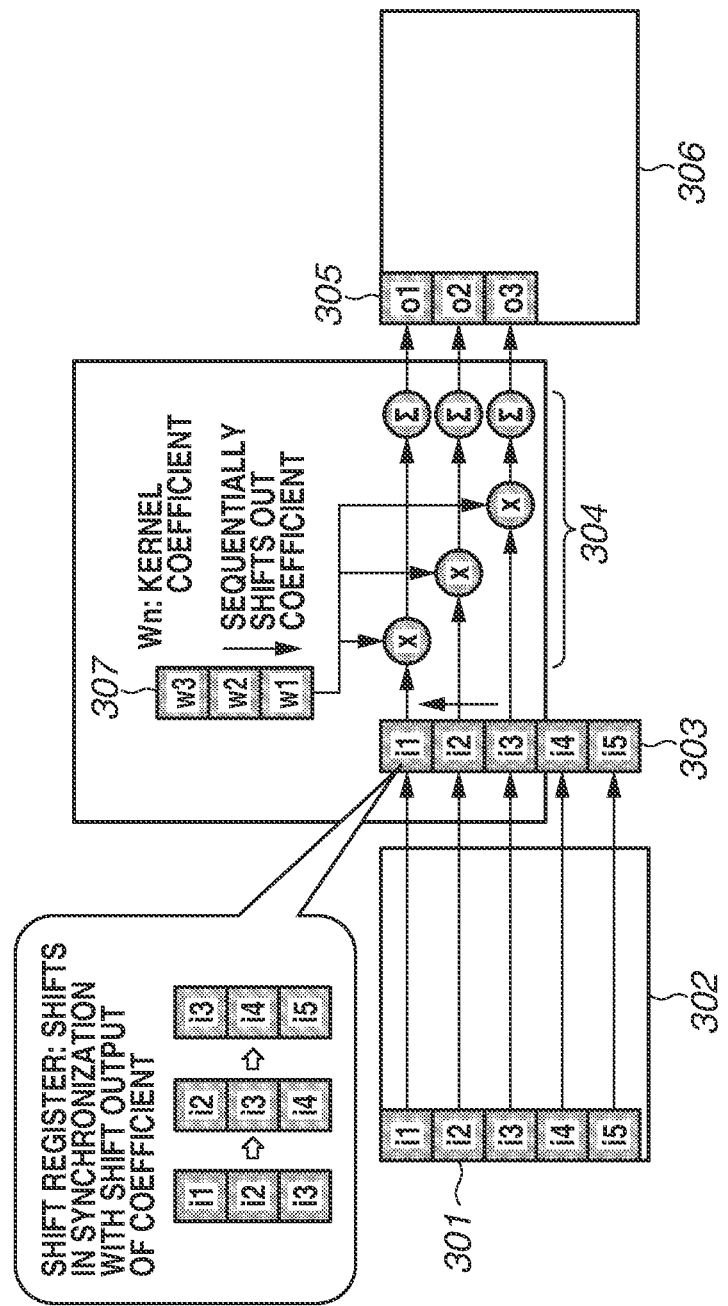

CONVOLUTIONAL NEURAL NETWORK BASED DATA PROCESSING APPARATUS, METHOD FOR CONTROLLING THE SAME, AND STORAGE MEDIUM STORING PROGRAM

CROSS-REFERENCE TO RELATED APPLICATIONS

This application is a continuation which claims the benefit of U.S. patent application Ser. No. 15/791,223 filed Oct. 23, 2017, which claims the benefit of Japanese Patent Application No. 2016-211897 filed Oct. 28, 2016, all of which are hereby incorporated by reference herein in their entirety.

BACKGROUND

Field of the Disclosure

The present disclosure relates to a data processing apparatus used for pattern recognition, a method for controlling the data processing apparatus, and a storage medium storing a program.

Description of the Related Art

Neural network techniques have been widely applied to image processing apparatuses such as pattern recognition apparatuses. Among neural networks, operation techniques called Convolutional Neural Networks (hereinafter referred to as CNN) are attracting attention as techniques for achieving robust pattern recognition against variations of a recognition target. For example, Yann LeCun, Koray Kavukvuoglu and Clement Farabet: Convolutional Networks and Applications in Vision, Proc. International Symposium on Circuits and Systems (ISCAS'10), IEEE, 2010 discloses diverse examples of applications and implementations of convolutional neural networks (CNN). For CNN processing, diverse network configurations have been proposed according to recognition target signals and implementation target recognition functions. A configuration of a convolutional neural network indicates the number of layers, the number of feature planes in each layer, and other configurations which can be represented by combination relations between convolution operations.

FIG. 16 illustrates a network configuration representing an example of simple CNN processing. When performing CNN processing on image data, an input layer 1601 is equivalent to raster-scanned image data with a predetermined size. Feature planes 1603a to 1603c indicate feature planes of a first layer 1608. A feature plane refers to a data plane equivalent to a processing result of a predetermined feature extraction operation (convolution operation and nonlinear processing). A feature plane is equivalent to a feature extraction result for recognizing a predetermined target in a higher layer. Since a feature plane is a processing result for raster-scanned image data, the processing result is also represented as a plane.

The feature planes 1603a to 1603c are generated through convolution operations and nonlinear processing corresponding to the input layer 1601. For example, the feature plane 1603a is calculated through a convolution operation of a (schematically illustrated) two-dimensional filter kernel 1602 1a and a nonlinear conversion of an operation result.

For example, the convolution operation with a filter kernel (filter coefficient matrix) size of columnSize×rowSize is processed through the following product-sum operation.

$$\text{output}(x, y) = \sum_{row=0}^{rowSize} \sum_{column=0}^{columnSize} \text{input}(x + \text{column}, y + \text{row}) \times \text{weight}(\text{column}, \text{row}) \quad (1)$$

where "input (x, y)" denotes the reference pixel value at the coordinates (x, y), "output (x, y)" denotes the operation result at the coordinates (x, y), "weight (column, row)" denotes the weight coefficient at the coordinates (x+column, y+row), and "columnSize" and "rowSize" denote the convolution kernel sizes.

In CNN processing, the product-sum operation is repeated while a plurality of filter kernels is being scanned for each pixel and a nonlinear conversion is performed on the final product-sum result to calculate feature planes. Since the feature plane 1603a is calculated based on one piece of image data in a preceding layer, the number of combinations is 1. The number of kernels 16021a for calculating the feature plane 1603a is one. Filter kernels 16021b and 16021c are used to calculate feature planes 1603b and 1603c, respectively. A filter kernel may be abbreviated to a filter or kernel.

FIG. 17 illustrates an example for calculating a feature plane 1605a in the CNN processing. The feature plane 1605a is calculated from the three feature planes 1603a to 1603c of the preceding layer 1608 and is combined with the feature planes 1603a to 1603c. When calculating data of the feature plane 1605a, firstly, a filter operation using a (schematically illustrated) kernel 16041a is performed on the feature plane 1603a, and the result is held in a cumulative adder 1701. Likewise, convolution operations on the kernels 16042a and 16043a are performed for the feature planes 1603b and 1603c, respectively, and the result is cumulatively added to the cumulative adder 1701. Upon completion of the convolution operations using three different kernels, nonlinear conversion processing 1702 based on a logistic function or a hyperbolic tangent function (tank function) is performed.

Performing the above-described processing on the entire image data while scanning each pixel enables calculating the feature plane 1605a. Likewise, a feature plane 1605b is calculated by using three different convolution operations indicated by kernels 16041b, 16042b, and 16043b on the three different feature planes 1603a to 1603c of the preceding layer 1608, respectively. Further, a feature plane 1607 is calculated by using two different convolution operations indicated by kernels 16061 and 16062 on the two different feature planes 1605a and 1605b of a preceding layer 1609, respectively.

It is assumed that each kernel coefficient is predetermined through learning by using a general learning method such as perceptron learning or propagation learning. For example, in object detection and pattern recognition, a convolution kernel with a size of 10×10 or larger may be used.

In this way, CNN processing requires a huge number of product-sum operations since the CNN processing hierarchically uses a larger number of convolution operations with large kernel sizes. To support various recognition tasks by using common hardware, it is demanded to efficiently process diverse networks with a high concurrency level.

Japanese Patent Application Laid-Open No. 2010-134697 discusses an apparatus which achieves high speed processing by parallelly performing convolution operations corresponding to a plurality of reception field positions (pixel positions of calculation target feature planes) by using a plurality of product-sum operators. US Patent No. 2012/0303932 discusses a CNN processing apparatus configured to assign operators to convolution kernels.

Although the apparatus discussed in Japanese Patent Application Laid-Open No. 2010-134697 parallelly processes a plurality of reception fields focusing on one calculation target feature plane, the apparatus may be unable to efficiently perform parallel processing depending on the kernel sizes and processing target areas. For example, with small kernel sizes, the time required to supply data to be input to product-sum operators becomes a bottleneck, possibly degrading parallelization efficiency.

SUMMARY

The present disclosure is directed to avoiding degradation of processing efficiency of product-sum operations by parallelly performing filter operations for partial reference data stored in a holding unit and a plurality of different filters.

According to an aspect of the present disclosure, a data processing apparatus includes a storage unit configured to store reference data of a filter operation and coefficient data of filters to be used for the filter operation, a plurality of operators configured to parallelly perform the filter operation on the reference data and the coefficient data of the filters, a first supply unit configured to hold a predetermined number of pieces of reference data transferred from the storage unit, and supply the transferred reference data to the plurality of operators, a second supply unit configured to hold coefficient data of a first filter and coefficient data of a second filter transferred from the storage unit, and supply the coefficient data of the first and second filters to the plurality of operators, and a control unit configured to control the second supply unit to supply the coefficient data of the first filter to a first operator of the plurality of operators, and supply the coefficient data of the second filter to a second operator of the plurality of operators.

Further features of the present disclosure will become apparent from the following description of exemplary embodiments with reference to the attached drawings.

BRIEF DESCRIPTION OF THE DRAWINGS

FIG. 3 illustrates a basic concept of a convolution operation according to one or more aspects of the present disclosure.

DESCRIPTION OF THE EMBODIMENTS

Figure 1:
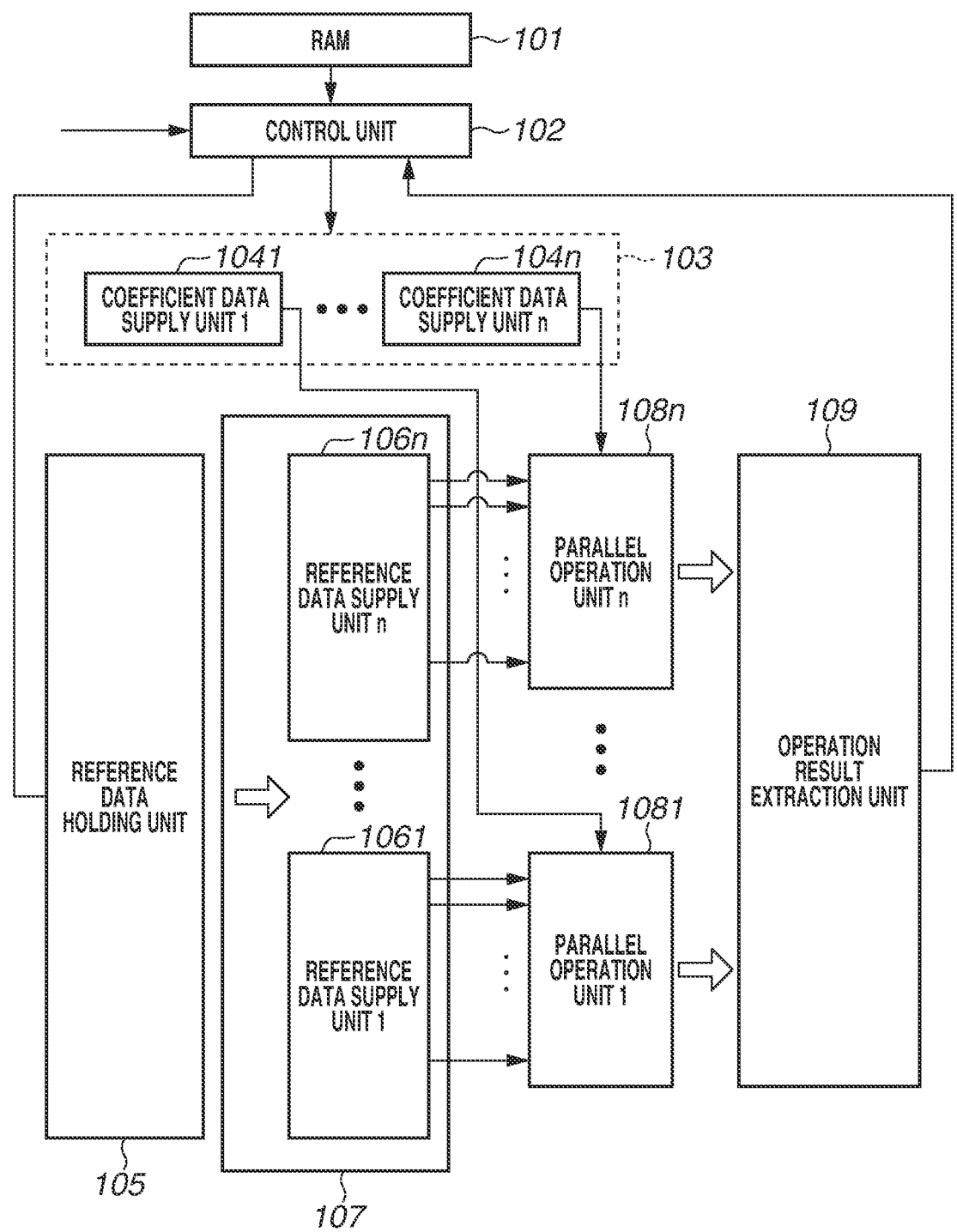
FIG. 1 is a block diagram illustrating an overall configuration of an operation circuit according to one or more aspects of the present disclosure.
Figure 16:
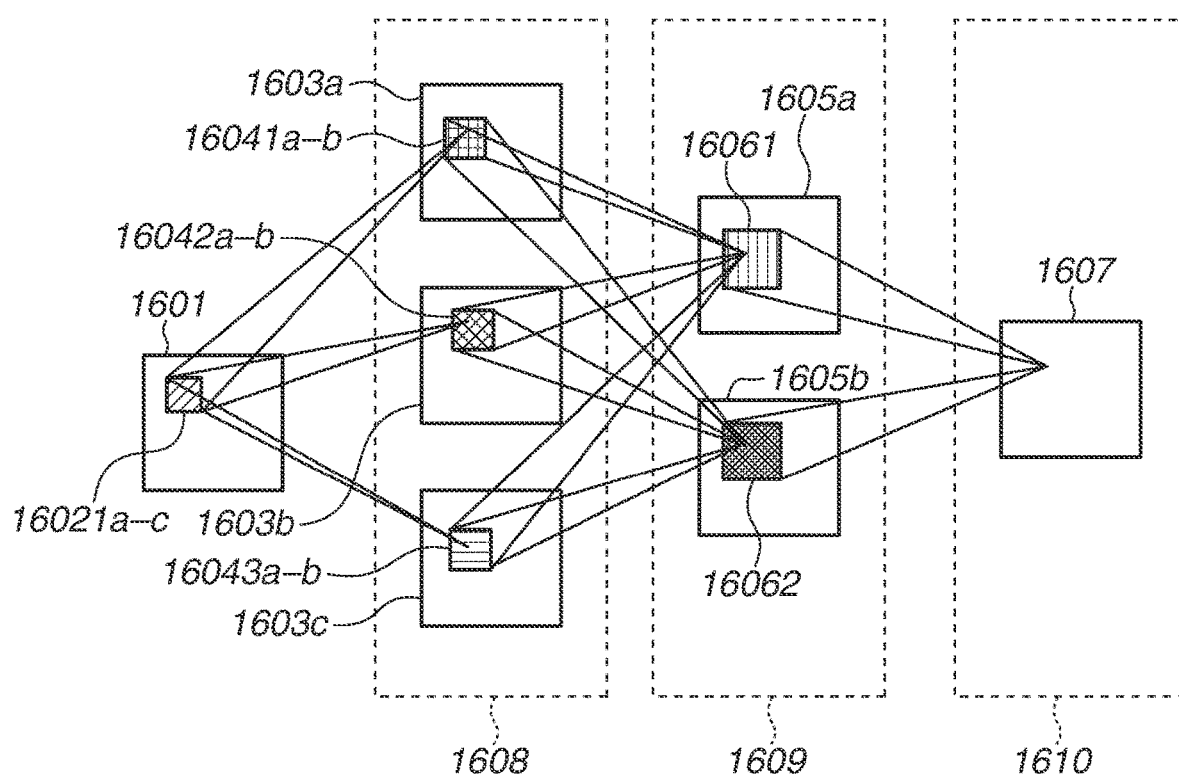
FIG. 16 illustrates a network configuration indicating an example of CNN processing according to one or more aspects of the present disclosure.
Figure 17:
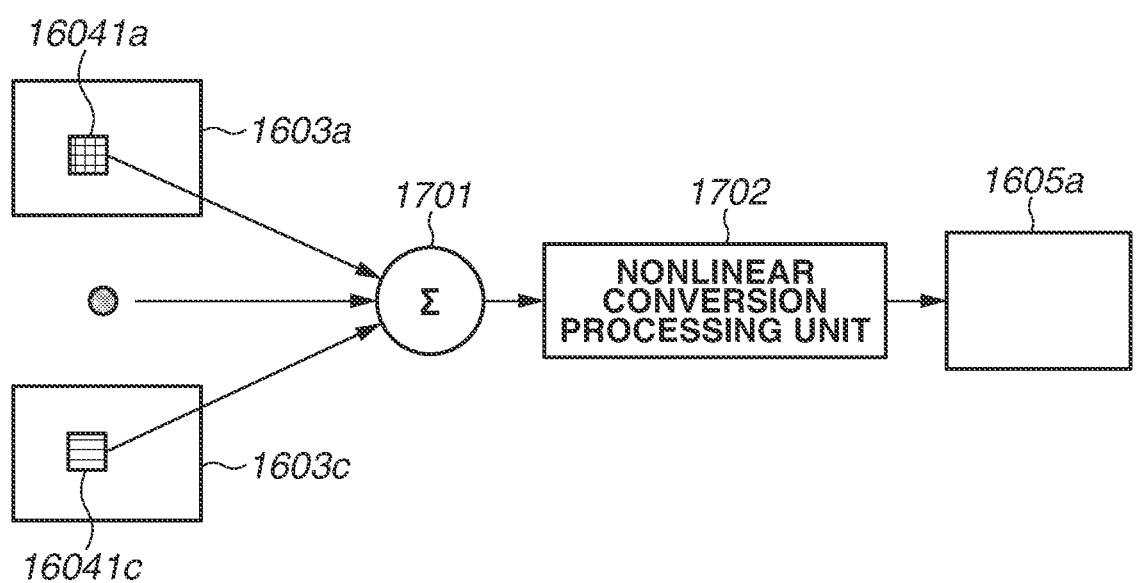
FIG. 17 illustrates a convolution operation in the CNN processing according to one or more aspects of the present disclosure.

A first exemplary embodiment of the present disclosure will be described below. FIG. 1 illustrates a configuration of an operation circuit according to the first exemplary embodiment of the present disclosure. The operation circuit illustrated in FIG. 1 sequentially calculates feature planes from the lowest level layer upward according to hierarchical combination relations of a plurality of data groups as illustrated in FIG. 16. Each of parallel operators 1081 to 108n is assumed to include m product-sum operators (m is 1 or a larger integer). The parallel operators 1081 to 108n parallelly operate on the same clock. A reference data supply unit 107 supplies reference data (part of feature plane data of a preceding layer required for convolution operations) buffered in a reference data holding unit 105 to the parallel operators 1081 to 108n at predetermined timing. The reference data supply unit 107 is divided into reference data supply units 1061 to 106n of a predetermined group, and parallelly supplies a plurality of pieces of different data to the parallel operators 1081 to 108n for each division group.

The reference data supply units 1061 to 106n, each of which includes shift registers, parallelly supply the values of the shift registers to the parallel operators 1081 to 108n, respectively. A coefficient data supply unit 103 supplies parameter data (weight coefficient data) required for convolution operations to the parallel operators 1081 to 108n. The coefficient data supply unit 103 is divided into predetermined groups, and supplies parameter data to the corresponding parallel operators 1081 to 108n for each division group. The coefficient data supply unit 103 supplies common data to a plurality of operators included in the parallel operators of the corresponding group. Although, in the present exemplary embodiment, the parameter data is stored in a random access memory (RAM) 101, the storage location is not limited to the RAM 101 and may be other storage units and storage devices. For example, the parameter data may be stored in a read only memory (ROM) (not illustrated). An operation result extraction unit 109 takes out the operation result each time the convolution operation ends. A control unit 102 performs control mainly related to data transfer. The operation result is stored in the RAM 101 and retained in the memory as reference data of the next layer. When processing the next layer, the control unit 102 refers to feature planes as the operation result of the preceding layer stored in the RAM 101. Thus, a multilayer network can be sequentially processed. According to the present exemplary embodiment, grouping the parallel operators 1081 to 108n, the reference data supply units 1061 to 106n, and the coefficient data supply units 1041 to 104n in a predetermined unit in advance enables assigning the operation circuit to a plurality of calculation target feature planes for each group.

The basic concept of the convolution operation according to the present exemplary embodiment will be described below with reference to FIG. 3. FIG. 3 illustrates an example calculation of a feature plane 306 from a reference feature plane 302 through the convolution operation. The following describes the concept for parallelly calculating feature plane data at three vertically-adjoining positions on the feature plane 306. The basic concept also applies to a case of parallelly calculating feature plane data at horizontally adjoining positions on the feature plane 306. The size of the convolution kernel (filter kernel) is assumed to be a 3-row by 1-column coefficient for the sake of description. Data 301 of the reference feature plane 302 is reference data required to parallelly calculate the data 305 of the feature plane 306.

Shift registers 303 and 307 illustrated in FIG. 3 retain the reference data 301 and the convolution kernel coefficient, respectively. The shift registers 303 and 307 sequentially operate in synchronization with a clock (not illustrated), and a parallel product-sum operator 304 parallelly performs the product-sum operations on the outputs. In this case, when focusing on o1 of the calculation target feature plane, $o1=i1 \times w1$ is calculated at the first clock, $o1=o1+i2 \times w2$ is calculated at the second clock, and $o1=o1+i3 \times w3$ is calculated at the third clock. Thus, a desired convolution result ($i1 \times w1+i2 \times w2+i3 \times w3$) can be obtained with three clocks. With a two-dimensional convolution kernel, a two-dimensional convolution operation is achieved when the CPU 102 performs similar processing on different reference and coefficient data by repeating the above-described processing for each column to cumulate operation results.

Performing a convolution operation based on the calculation feature plane 306 in this way enables parallelly calculating the data of the feature plane 306 at the position corresponding to the concurrency level of the product-sum operator 304 with the number of clocks according to the size of the filter kernel.

The present exemplary embodiment will be described below centering on the parallel convolution operation technique based on the calculation target feature plane. The operation technique according to the present exemplary embodiment is characterized in that there is no causal relation between the size of the filter kernel and the concurrency level of the product-sum operator 304. More specifically, a convolution operation can be processed with various concurrency levels.

Figure 2A:
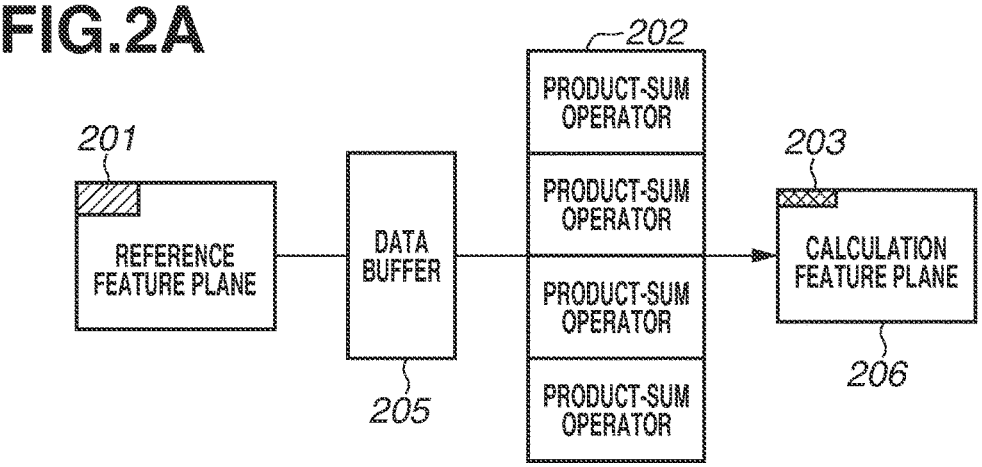
FIGS. 2A, 2B, and 2C illustrate an operation circuit according to one or more aspects of the present disclosure.
Figure 2B:
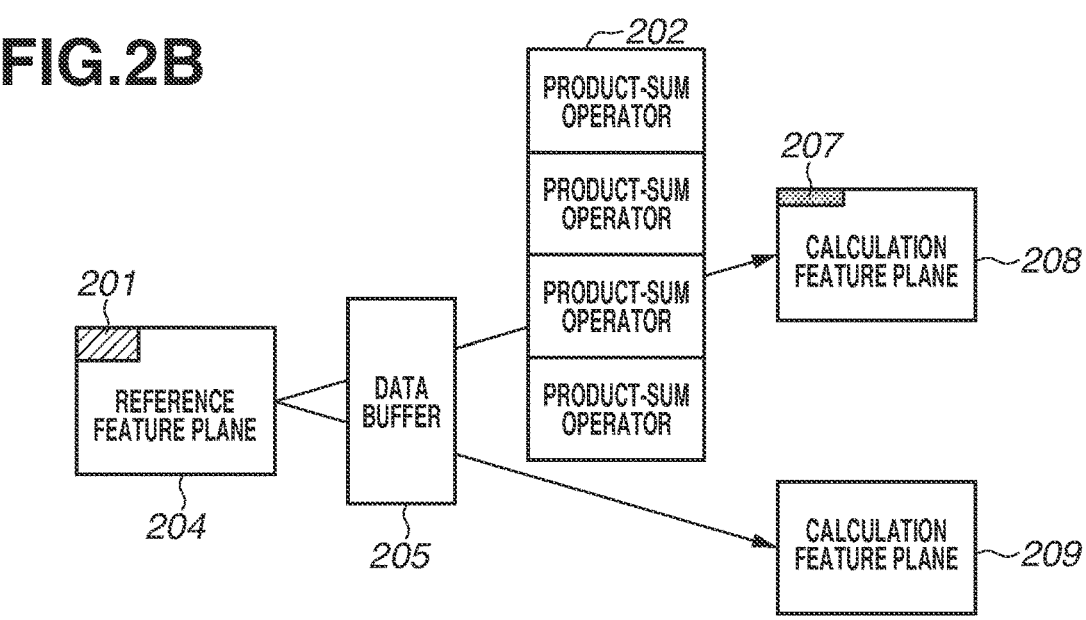
Figure 2C:
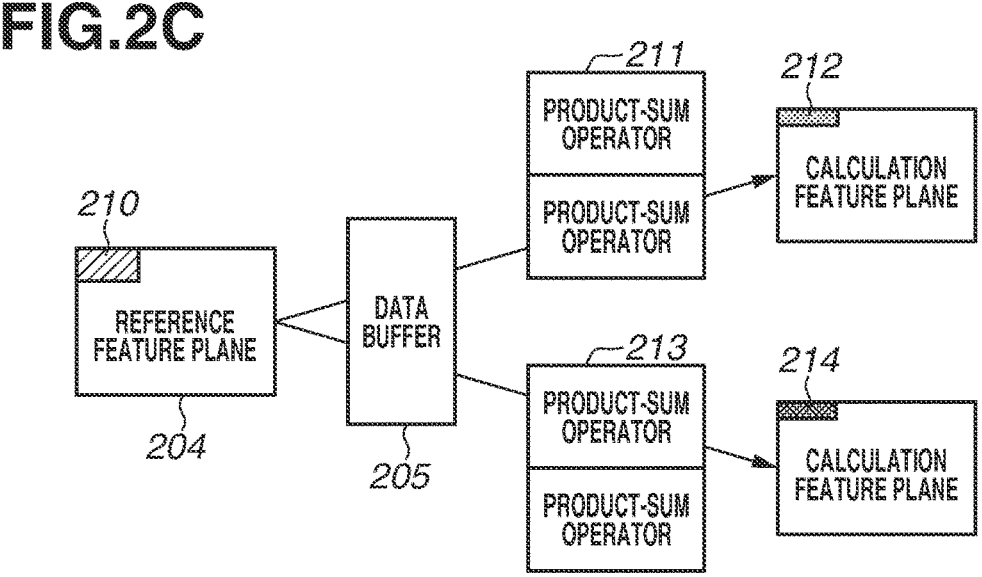

FIGS. 2A to 2C conceptually illustrate operation modes of the operation circuit illustrated in FIG. 1.

FIG. 2A illustrates an example for calculating a network having a 1-to-1 combination relation by using four different product-sum operators 202 operating in parallel. In this case, the control unit 102 parallelly processes the convolution operations of a 4-pixel calculation area 203 on a calculation target feature plane 206. The product-sum operators 202 perform operations while referring to, via a data buffer 205, required reference data 201 determined by the contents of the convolution operations.

FIG. 2B illustrates an example for processing a network having a 1-to-2 combination relation in the configuration illustrated in FIG. 2A. The control unit 102 sequentially calculates feature planes 208 and 209 in this order by using the four parallel product-sum operators 202. Although the calculation target feature planes 208 and 209 refer to common reference data, it is necessary to sequentially calculate the feature planes. Therefore, the same reference data 201 will be transferred to the data buffer 205 in each processing of the feature planes.

Referring to FIG. 2C, the different feature planes 208 and 209 are simultaneously calculated by using two pairs of the parallel product-sum operators, i.e., a pair of the parallel product-sum operators 211 and a pair of the parallel product-sum operators 213. More specifically, the value of a 2-pixel calculation area 212 on the calculation target feature plane 208 are parallelly calculated by the parallel product-sum operators 211, and the value of a 2-pixel calculation area 214 on the calculation target feature plane 209 are parallelly calculated by the parallel product-sum operators 213. In this case, in calculating the feature planes 208 and 209, reference data 210 of a reference feature plane 204 commonly required for the calculation is stored in the data buffer 205. Reference feature planes are stored in the RAM 101 which is generally a low-speed large-capacity memory. On the other hand, the data buffer 205 includes a high-speed small-capacity memory and registers. As illustrated in FIG. 2C, the reference data can be shared through the data buffer 205 when parallelly calculating a plurality of feature planes, more specifically, when calculating the feature planes 208 and 209. Therefore, the configuration illustrated in FIG. 2C makes it possible to reduce by half the number of transfers of the reference data from the RAM 101 to the data buffer 205 compared with a case where the feature planes are sequentially calculated in the configuration illustrated in FIG. 2B. When the transfer rate of the reference data is not taken into consideration, the time to calculate feature planes is identical in the configurations illustrated in FIGS. 2B and 2C. On the other hand, when the data transfer rate is low, the time to calculate feature planes is restrained by the data transfer time in the configuration illustrated in FIG. 2B. Therefore, the time to calculate feature planes in the configuration illustrated in FIG. 2B may be longer than the time to calculate feature planes in the configuration illustrated in FIG. 2C.

As illustrated in this example, instead of calculating feature planes in the configuration illustrated in FIG. 2B, switching between the configurations illustrated in FIGS. 2A and 2C according to the network configuration and the operation conditions of a CNN enables bringing out the best performance for the number of parallel operators.

According to the present exemplary embodiment, a parallel operation processing circuit capable of optimizing the operation circuit assignment parallelly operating according to the network configuration and operation conditions of the CNN (the number of parallel operators to be assigned to calculation target feature planes).

The configuration illustrated in FIG. 1 will be described in more detail below with reference to FIGS. 4A, 4B, 5A, and 5B. Although the following describes a case where the configuration includes two operator groups, the configuration may include operators in addition to the two operator groups. This is an example configuration which makes it possible to select two cases, a case where all of the operators are used to calculate one feature plane and a case where the operators are divided to calculate two feature planes. This configuration is equivalent to switching between the operation processing illustrated in FIG. 2A and the operation processing illustrated in and FIG. 2C. FIGS. 4A, 4B, 5A, and 5B illustrate a case where processing target feature planes are switched in units of two groups, but, the configuration is not limited thereto. The operators may be divided into more groups.

FIGS. 4A, 4B, 5A, and 5B illustrate the operation modes having different assignments of parallel operators as common hardware. FIGS. 4A, 4B, 5A, and 5B illustrate in more detail the configuration illustrated in FIG. 1, and identical numbers indicate identical elements. The following describes only portions different from the configuration illustrated in FIG. 1.

The following first describes basic common operations of the convolution operation processing according to the present exemplary embodiment and then describes a plurality of operation modes in which the present exemplary embodiment is characterized.

The reference data holding unit (reference data buffer) 105 includes a predetermined number of registers. The reference data holding unit 105 includes at least the same number of registers as the number of pieces of data to be stored in reference data shift registers 402a and 402b. The control unit 102 transfers the data to be referenced by parallel product-sum operators 108a and 108b from the ROM 101 to the resisters. The reference data supply unit 107 includes a selector 401 and the reference data shift registers 402a and 402b. The reference data shift registers 402a and 402b parallelly supply m pieces of reference data to the parallel product-sum operators 108a and 108b, respectively. The reference data shift registers 402a and 402b sequentially shift the data to be supplied in response to a clock (not illustrated). The coefficient data supply unit 103 includes a coefficient data buffer 403, a selector 404, and coefficient data shift registers 405a and 405b. The coefficient data buffer 403 includes a predetermined number of registers.

The coefficient data buffer 103 includes at least the same number of registers as the number of pieces of data to be stored in the coefficient data shift registers 405a and 405b. The parameter data stored in the RAM 101 (the weight coefficient data of the convolution operations) is transferred to the coefficient data buffer 403 by the control unit 102. The selector 404 selects the data distribution to the coefficient data shift registers 405a and 405b. The respective outputs of the coefficient data shift registers 405a and 405b are connected to the parallel product-sum operators 108a and 108b.

Coefficients input to the parallel product-sum operators 108a and 108b are common data for each group. The parallel product-sum operators 108a and 108b are assumed to include a plurality of product-sum operators which operate on the same clock. The selectors 401 and 404 are multiplexers for selecting the output of the reference data buffer 105 and the coefficient data buffer 403, respectively (described in detail below).

Figure 6:
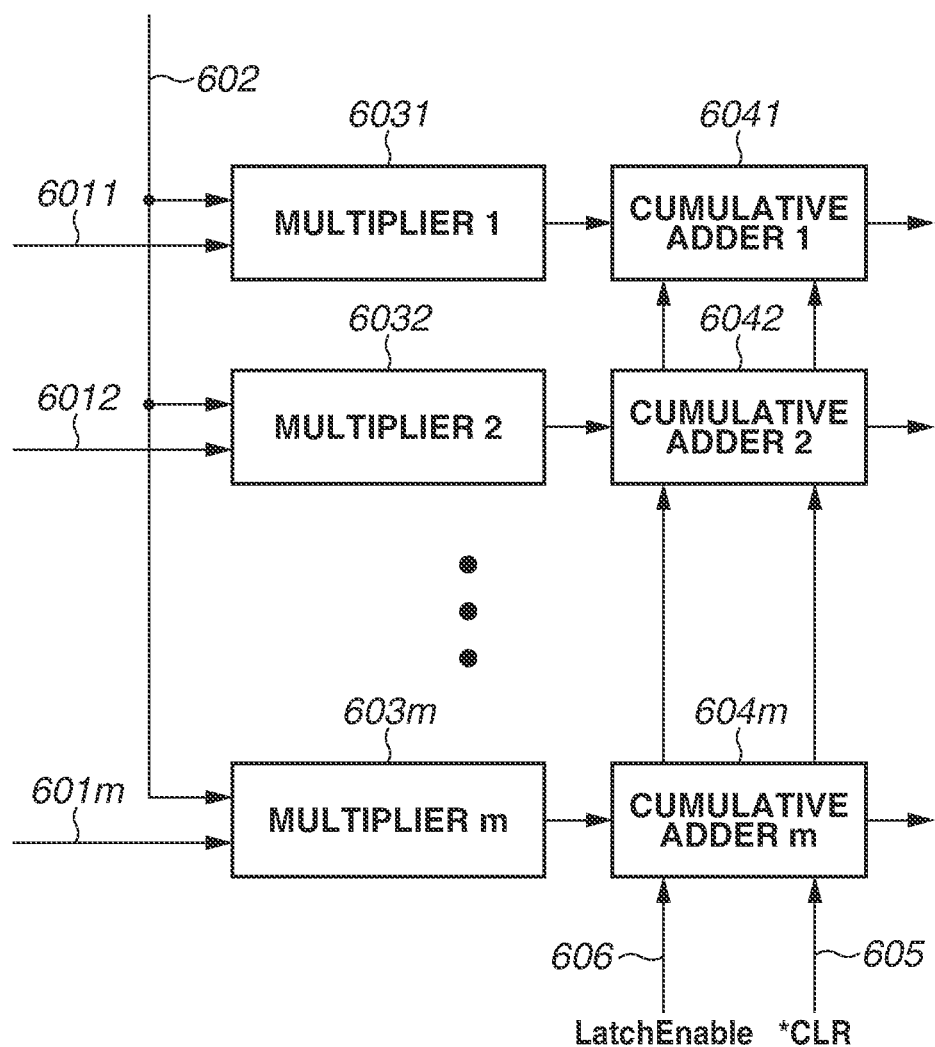
FIG. 6 illustrates a configuration of a parallel product-sum operator according to one or more aspects of the present disclosure.

FIG. 6 illustrates the configuration of the parallel product-sum operators 108a and 108B. Outputs 6011 to 601m of the reference data supply unit 107 supply different data to multipliers 6031 to 603m, respectively. An output 602 of the coefficient data supply unit 103 supplies common data to the multipliers 6031 to 603m. Cumulative adders 6041 to 604m cumulate multiplication results during the period of convolution kernel operation. Upon completion of a predetermined convolution operation unit, a clear signal 605 is used to clear internal latches of the cumulative adders 6041 to 604m. A Latch Enable signal 606 updates the cumulative addition value by using the clear signal 605. A signal synchronizing with a clock signal (not illustrated) is assumed to be connected to the Latch Enable signal 606.

The operation result extraction unit 109 includes result shift registers 407a and 407b, etc. The result shift registers 407a and 407b latch the output data of the parallel product-sum operators 108a and 108b, respectively, at predetermined timing, and output the data through shift operations. A nonlinear conversion process unit 408 performs nonlinear conversion processing on the convolution operation result as required. The conversion result is recorded in a predetermined area of the RAM 101 via the control unit 102.

Figure 12:
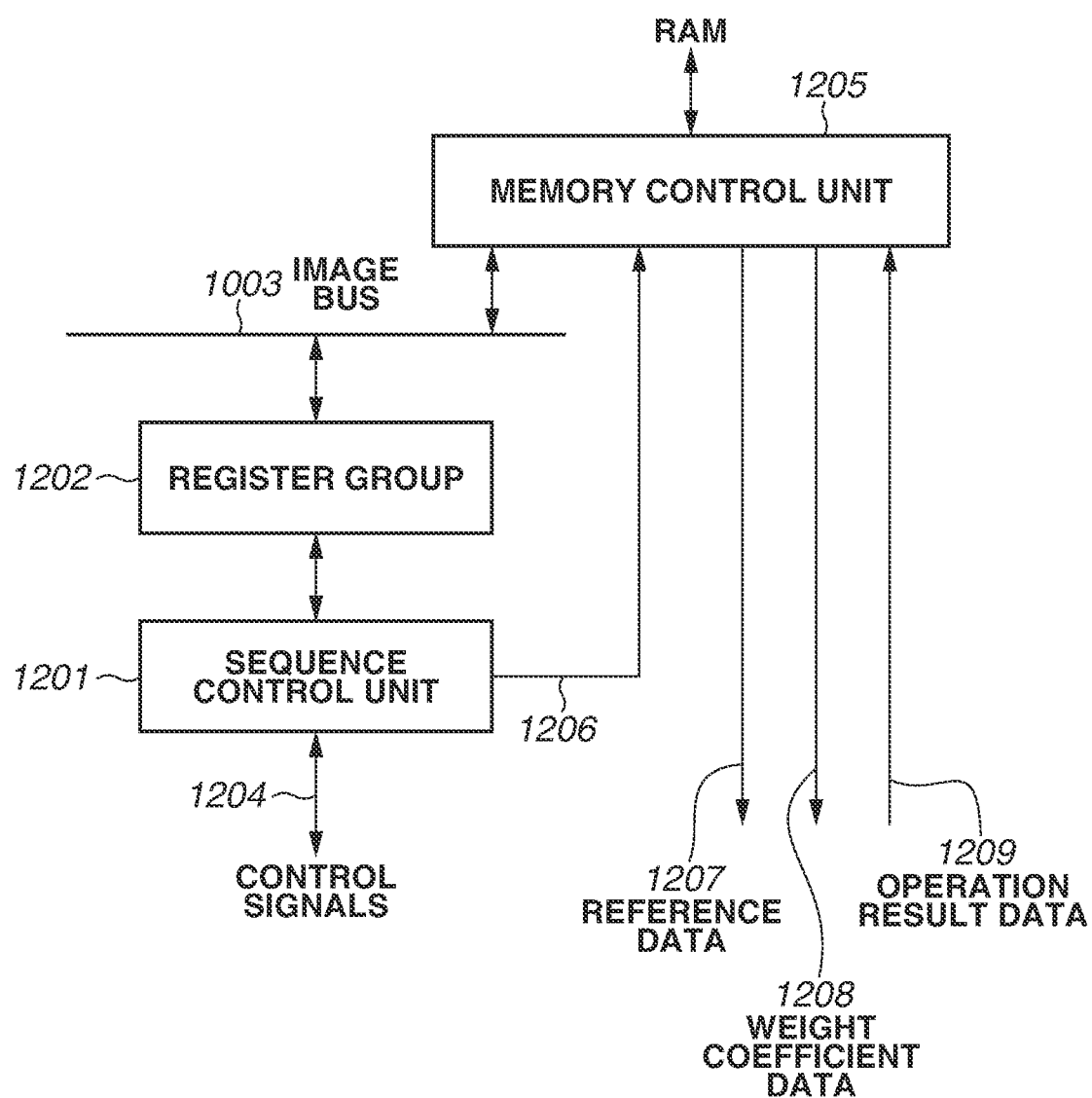
FIG. 12 illustrates details of a control unit according to one or more aspects of the present disclosure.

FIG. 12 illustrates details of the control unit 102. A sequence control unit 1201 outputs and inputs various control signals 1204 for controlling operations of an operation circuit 1002 according to information set in a register group 1202. Likewise, the sequence control unit 1201 generates a control signal 1206 for controlling a memory control unit 1205. The sequence control unit 1201 includes a sequencer including binary counters and Johnson counters. A register group 1202 including a plurality of register sets stores information for performing hierarchical processing. Recorded information include, for example, information about a reference target feature plane and calculation target feature planes, information about kernels, and information about the order of processing feature planes. Predetermined values are written to the register group 1202 in advance from a central processing unit (CPU) 1007 via a bridge 1004 and an image bus 1003.

The convolution operation according to the present exemplary embodiment parallelly calculates a plurality of pieces of data at m horizontally adjoining pixel positions on the calculation feature planes for each group. The coefficient data buffer 403 and the coefficient data shift registers 405a and 405b include at least a larger number of registers than the horizontal size of the convolution kernel. For example, with data having an 8-bit weight coefficient, the coefficient data buffer 403 and the coefficient data shift registers 405a and 405b include a plurality of registers having an 8-bit width. For example, when the horizontal convolution kernel size is "11", the number of registers is "11".

Actually, the number of registers is set to the assumed maximum kernel size. The control unit 102 loads from the RAM 101 into the coefficient data buffer 403 coefficients required for the product-sum operation processing on the next row during shift operations of the coefficient data shift registers 405a and 405b.

The reference data buffer 105 is used to temporarily store the reference data stored in the RAM 101. With data having 8-bit reference data, the reference data buffer 105 includes a plurality of registers having an 8-bit width. The reference data buffer 105 includes at least a predetermined number of registers. The predetermined number is calculated, for example, by ("Number of pieces of data processed in parallel"+"Convolution kernel size in the same direction as the parallel processing direction"−1)×"Number of groups". The control unit 102 loads from the RAM 101 into the reference data buffer 105 reference data required for the processing on the next row during shift operations of the reference data shift registers 402a and 402b. As described above with reference to FIG. 3, the convolution operation is processed through shift operations of the reference data shift registers 402a and 402b and the coefficient data shift registers 405a and 405b.

The above-described processing makes it possible to pipeline the product-sum operation processing and the data loading from the RAM 101 for each horizontal row of the convolution kernel.

The reference data shift registers 402a and 402b, the coefficient data shift registers 405a and 405b, the result shift registers 407a and 407b are shift registers having a data load function. The reference data shift registers 402a and 402b and the coefficient data shift registers 405a and 405b include a plurality of registers having the same bit width as the reference data buffer 105 and the coefficient data buffer 103, respectively. The result shift registers 407a and 407b includes a plurality of registers having the same number of bits as the output data of the parallel product-sum operators 108a and 108b.

Figure 7:
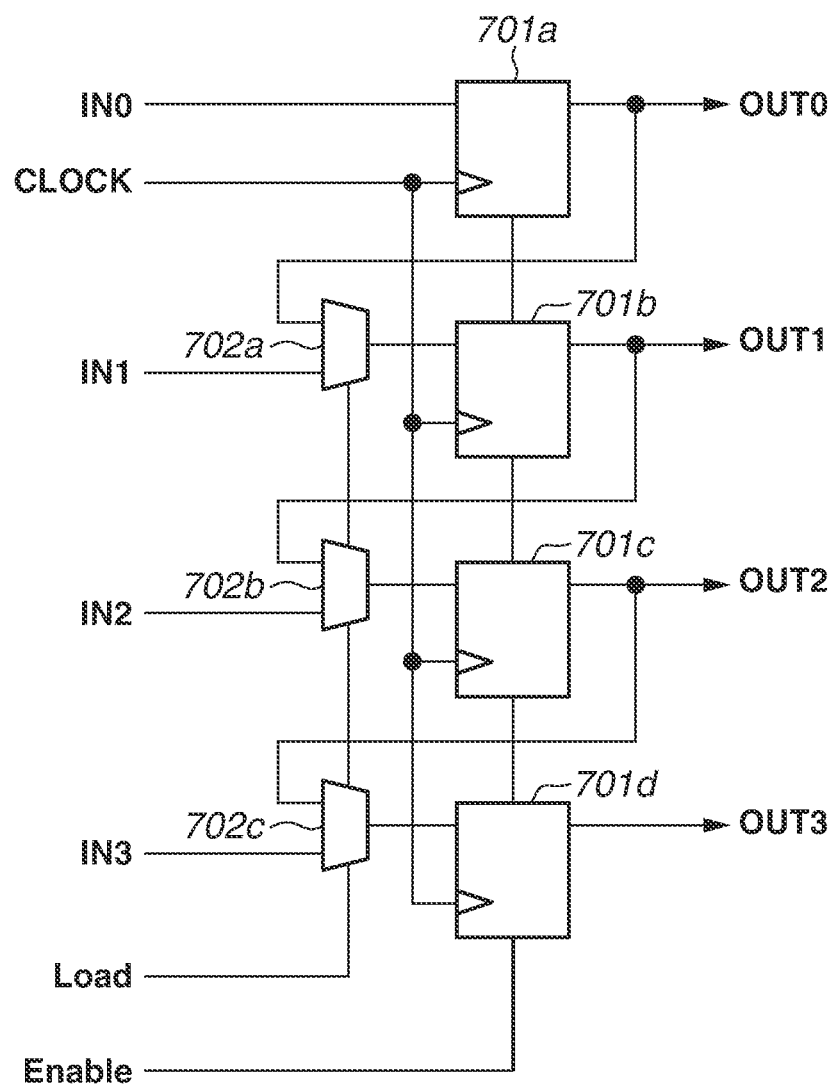
FIG. 7 illustrates details of shift registers according to one or more aspects of the present disclosure.

An example configuration of these shift registers is illustrated in FIG. 7. FIG. 7 illustrates an example case where four registers are used. Multi-bit flip-flops 701a to 701d latch data having a predetermined number of bits in synchronization with a CLOCK signal. Selectors 702a to 702c select OUT0 to OUT2, respectively, when a selection signal (Load signal) is 0, and select IN1 to IN3, respectively, when the selection signal is 1.

More specifically, the shift or the load operation is selected according to the Load signal. An Enable signal is a signal for enabling data transition. When the Enable signal is 1, the flip-flops 701a to 701d latch data on the rising edge of the CLOCK signal. When the Enable signal is 0, the flip-flops 701a to 701d retain the latched data as it is (without performing state transition).

Figure 4A:
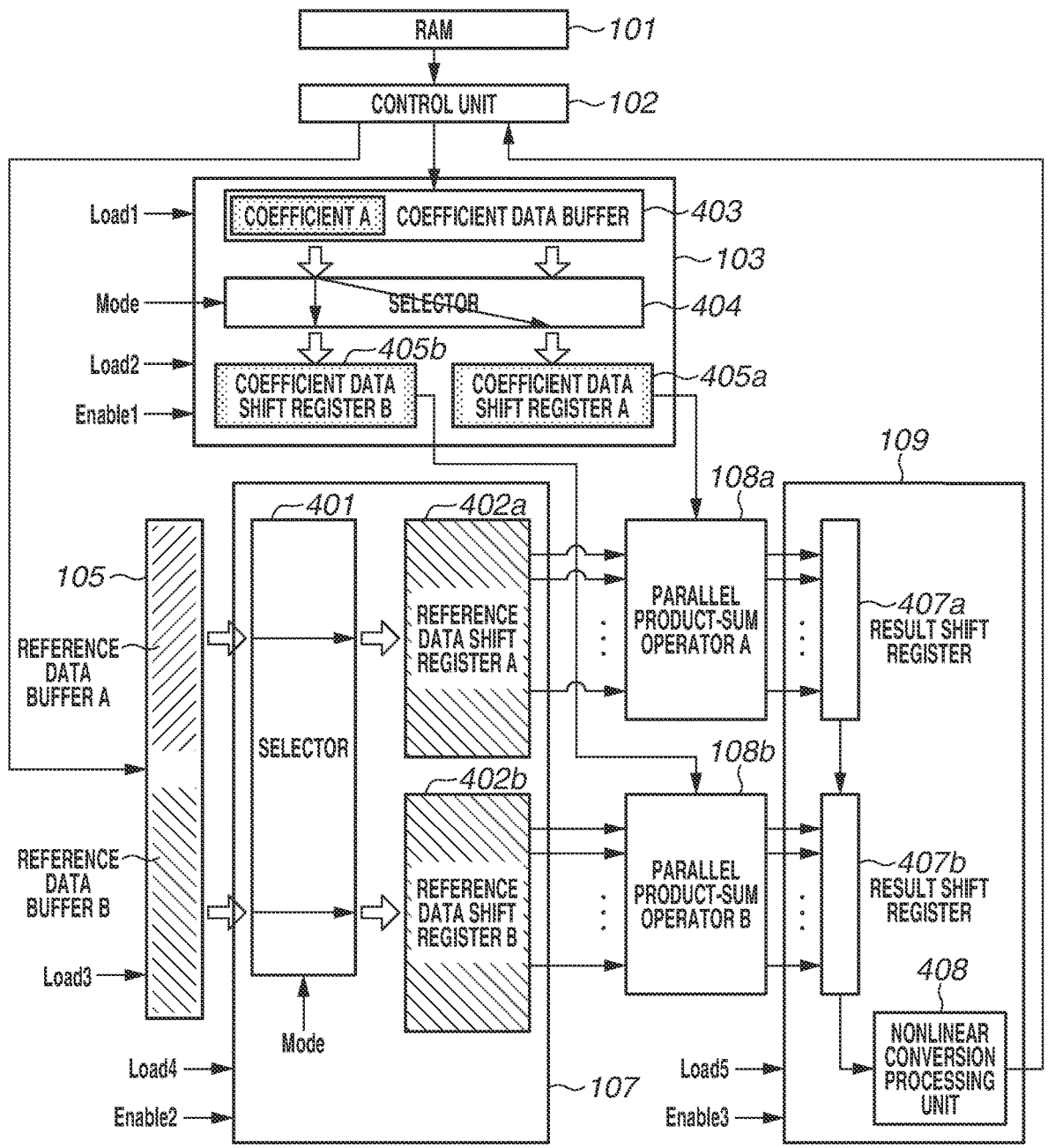
FIG. 4A illustrates a detailed configuration and operations of the operation circuit according to one or more aspects of the present disclosure.

Referring to FIG. 4A, Load2, Load4, and Load5 signals are Load signals for the coefficient data shift registers 405a and 405b, the reference data shift registers 402a and 402b, and the result shift registers 407a and 407b, respectively. Referring to FIG. 4A, Enable1, Enable2, and Enable3 signals are Enables signals for the coefficient data shift registers 405a and 405b, the reference data shift registers 402a and 402b, and the result shift registers 407a and 407b, respectively. After loading initial data (collectively loading a plurality of pieces of data stored in the coefficient data buffer 403 via the selector 404), the coefficient data shift registers 405a and 405b perform shift operations for the same number of clocks as the horizontal size of the convolution kernel. The coefficient data shift registers 405a and 405b sequentially supply the weight coefficient data to the parallel product-sum operators 108a and 108b, respectively, in response to the shift operations. The OUTn signals (illustrated in FIG. 7) of the coefficient data shift registers 405a and 405b (last stage outputs of shift registers) are commonly connected to all of the parallel product-sum operators 108a and 108b, respectively.

Likewise, when the initial data is loaded from the reference data buffer 105 via the selector 401, the reference data shift registers 402a and 402b perform shift operations for the same number of clocks as the horizontal size of the convolution kernel. The reference data shift registers 402a and 402b simultaneously supply a plurality of pieces of reference data (OUT1 to OUTn signals illustrated in FIG. 7) to the parallel product-sum operators 108a and 108b, respectively.

The coefficient data shift registers 405a and 405b and the reference data shift registers 402a and 402b operate in synchronization with each other. According to the data supplied from the coefficient data shift registers 405a and 405b and the reference data shift registers 402a and 402b, the product-sum operations are performed by the parallel product-sum operators 108a and 108b, respectively.

Upon completion of operations of all of the convolution kernels corresponding to the target feature planes, the cumulative sum obtained as above is loaded into the result shift registers 407a and 407b and then sent to the nonlinear conversion process unit 408 at a predetermined timing. Each of the parallel product-sum operators 108a and 108b is assumed to include m identical circuits operating on the same clock.

The result shift registers 407a and 407b include flip-flops that can retain m outputs of product-sum operations. Only predetermined effective bits of the outputs of the parallel product-sum operators 108a and 108b are connected to the result shift registers 407a and 407b, respectively.

The nonlinear conversion process unit 408 includes a look-up table. Data that has undergone the conversion processing by the nonlinear conversion process unit 408 is stored in a predetermined address of the RAM 101. The storage address in this case is also controlled by the control unit 102.

Figure 8:
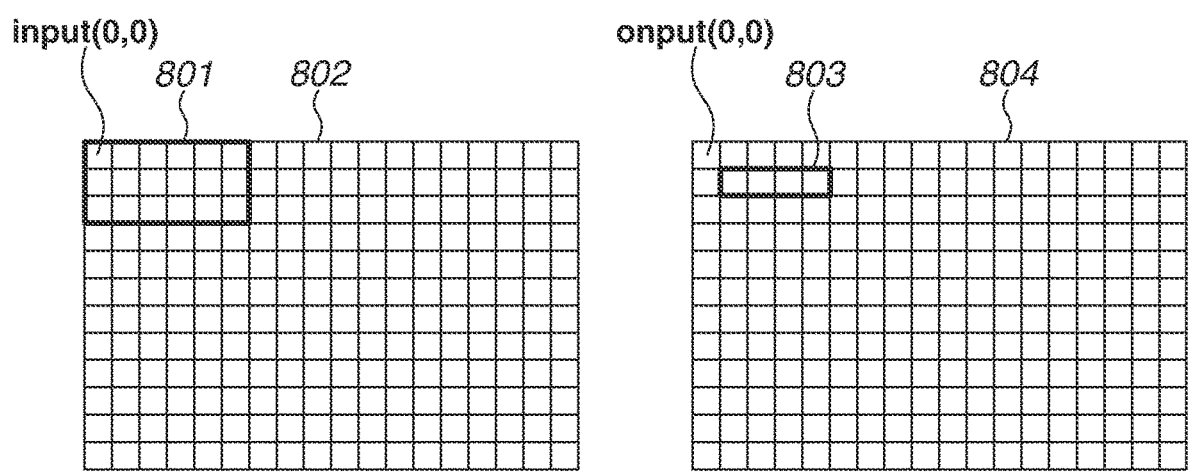
FIG. 8 illustrates an example of parallel convolution operations according to one or more aspects of the present disclosure.

FIG. 8 schematically illustrates a specific example of parallel processing by the operation circuit according to the present exemplary embodiment. Each of a reference data plane 802 and a calculation data plane 804 illustrated in FIG. 8 is represented by the coordinates of raster-scanned data. The reference feature plane 802 is assumed to represent the operation result (input (x, y), x: horizontal position, y: vertical position) for the preceding layer stored in the RAM 101 in order of raster scanning of each piece of data (schematically illustrated minimum values). The calculation data plane 804 represents the operation result (output (x, y), x: horizontal position, y: vertical position) of raster-scanned data.

A calculation range 803 indicates the position of data parallelly operated by the parallel product-sum operator 108a or 108b (when m=8). A reference range 801 is a range of the reference data for the calculation range 803 when the kernel size of the convolution operation is 3×3. The control unit 102 sequentially transfers data of each line in the reference range 801 to a reference data register buffer. The parallel product-sum operators 108a and 108b achieve the convolution operations accompanying reference data shift operations.

Figure 4B:
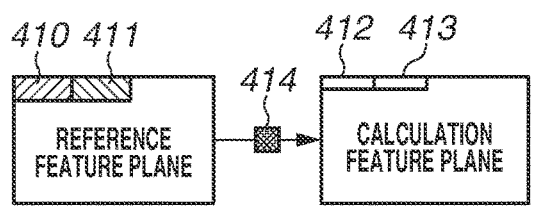
FIG. 4B illustrates a network configuration and operational relations of a convolutional neural network (CNN) according to one or more aspects of the present disclosure.
Figure 5A:
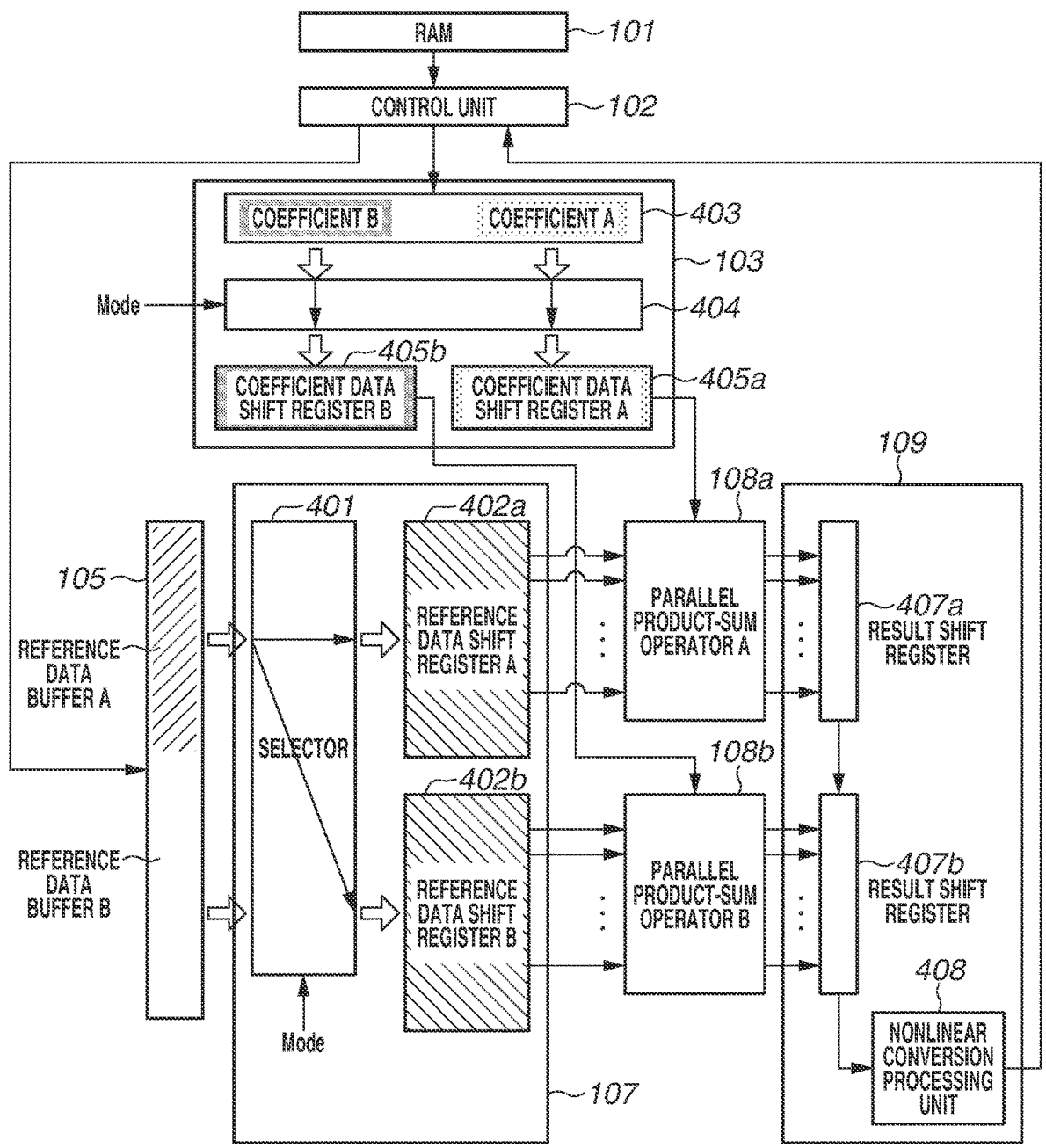
FIG. 5A illustrates another detailed configuration and operations of the operation circuit according to one or more aspects of the present disclosure.
Figure 9:
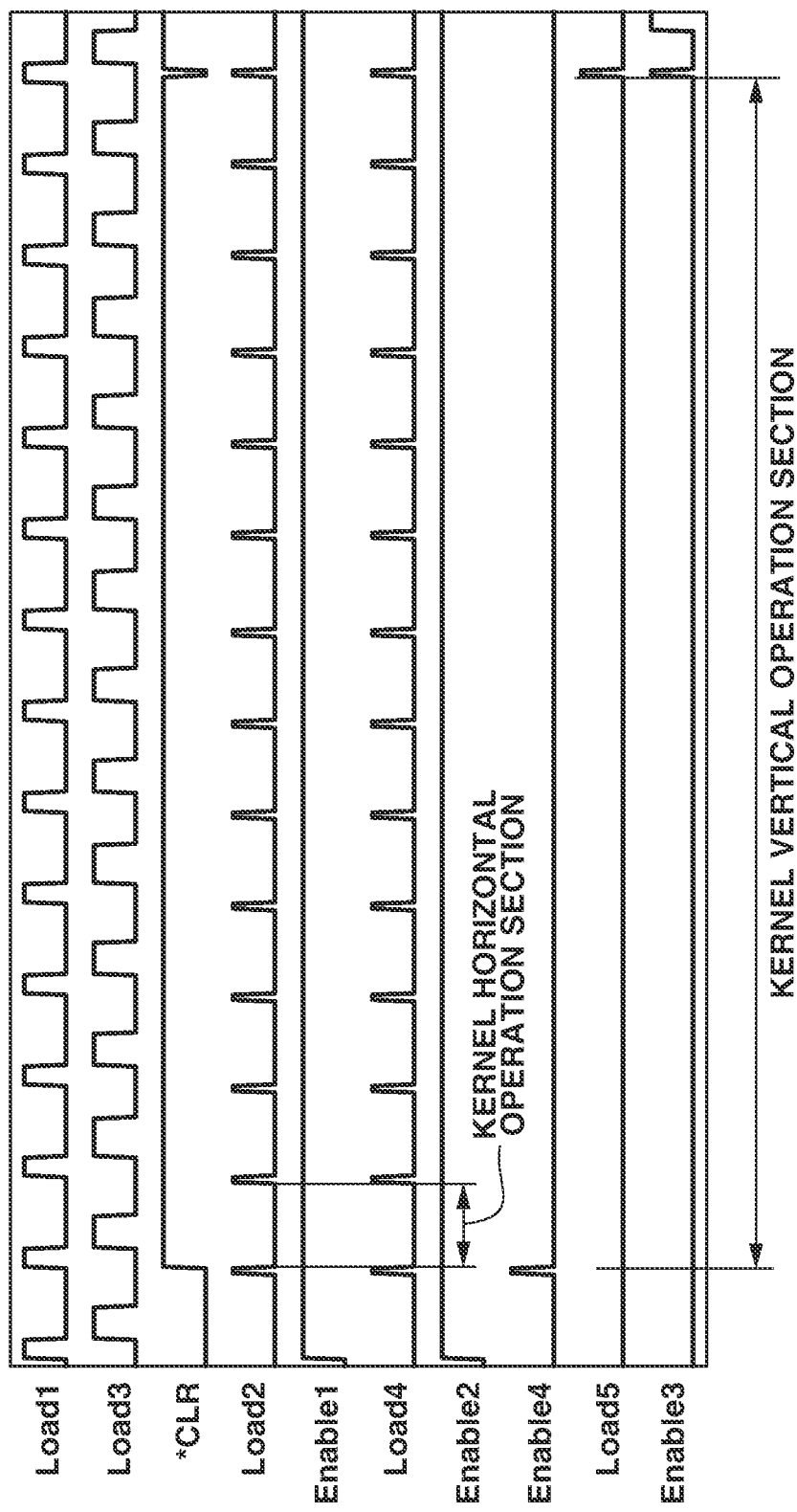
FIG. 9 is a time chart illustrating operations according to one or more aspects of the present disclosure.

FIG. 9 is a time chart illustrating common operations of the convolution operation of the operation circuit illustrated in FIG. 4A or 5A. Characteristic operations of the operation circuit will be described below with reference to FIGS. 4A, 4B, and 9. FIG. 9 illustrates a part of convolution operation processing for one feature plane. All of the signals illustrated in FIG. 9 synchronously operate based on a clock signal (not illustrated).

A Load1 signal indicates an enabling signal for loading weight data into the coefficient data buffer 403. The control unit 102 reads the weight data for one row in the horizontal direction from the RAM 101 during a period when the signal is enabled (signal level is 1), and writes the weight data in the coefficient data buffer 403. If the RAM 101 has a 32-bit data width and the weight coefficient has an 8-bit data width, when writing three weight coefficients in the horizontal direction in the coefficient data buffer 403, the load processing completes in one clock. The following descriptions are on the premise that all of read/write cycles on the RAM 101 are completed in one clock.

Upon completion of loading of weight coefficients, the control unit 102 enables a Load3 signal to start loading the reference data. Like the Load1 signal, the Load3 signal is also assumed to be enabled when the signal level is 1. Simultaneously with the timing when the Load3 signal is enabled, the control unit 102 extracts the reference data from the RAM 101 and sets the reference data in the reference data buffer 105. The number of pieces of data to be set is determined by the size of the convolution kernel and the concurrency level.

The control unit 102 determines the address of the data to be read from the RAM 101. If the number of effective bits of the reference data is 8, it is necessary to load 3+3−1=5 pieces of data since the horizontal size of the convolution kernel is 3 and the operation concurrency level is 4 in the example illustrated in FIG. 8. Therefore, the write sequence completes in 2 cycles.

A *CLR signal is a signal for initializing the cumulative adders 6041 to 604m of the parallel product-sum operators 108a and 108b. When the signal is 0, the registers included in the cumulative adders 6041 to 604m are initialized to 0. The control unit 102 sets the signal to 0 before starting the convolution operation at a new feature plane position.

The Load2 signal is a signal for instructing to initialize the coefficient data shift registers 405a and 405b. When the Load2 signal is 1 and the Enable1 signal is enabled (signal level 1), the CPU 102 collectively loads a plurality of pieces of weight coefficient data to be stored in the coefficient data buffer 403 into the coefficient data shift registers 405a and 405b. Although the Enable1 signal is a signal for controlling the data transition of the shift registers, the Enable1 signal is constantly set to 1 during operation, as illustrated in FIG. 9. Therefore, when the Load2 signal is 1, the control unit 102 latches the output of the coefficient data buffer 403 in response to the clock signal. When the Load2 signal is 0, the control unit 102 continues the shift processing in response to the clock signal.

When the sequence control unit 1201 of the control unit 102 counts the number of clocks according to the horizontal size of the convolution kernel, the sequence control unit 1201 enables the Load2 signal to stop the shift operations. At the same time, the sequence control unit 1201 collectively loads the weight coefficient data to be stored in the coefficient data buffer 403 into the coefficient data shift registers 405a and 405b via the selector 404. More specifically, the sequence control unit 1201 collectively loads the weight coefficient in each horizontal direction of the convolution kernel, and shifts out the loaded coefficient in response to the operation clock.

The Load4 signal is a signal for instructing to initialize the reference data shift registers 402a and 402b. When the signal is 1 and the Enable2 signal is enabled (signal level 1), the CPU 102 collectively loads the reference data to be stored in the reference data buffer 105 into the reference data shift registers 402a and 402b via the selector 401. The Enable2 signal is a signal for controlling the data transition of the shift registers. As illustrated in FIG. 9, the Enable2 signal is constantly set to 1 during operation. Therefore, when the Load4 signal is 1, the control unit 102 latches the output of the reference data buffer 105 in response to the clock signal. When the Load4 signal is 0, the control unit 102 continues the shift processing in response to the clock signal.

When the sequence control unit 1201 of the control unit 102 counts the number of clocks according to the horizontal size of the convolution kernel, the sequence control unit 1201 enables the Load4 signal to stop the shift operations. At the same time, the sequence control unit 1201 collectively loads the reference data to be stored in the reference data buffer 105.

More specifically, the CPU 102 collectively loads the required reference data for each column of the convolution kernel, and shifts the loaded reference data in response to the operation clock.

In this way, the control unit 102 controls the Load4 signal at the same timing as the Load2 signal.

The parallel product-sum operators 108a and 108b continue the product-sum operation in synchronization with a clock. Therefore, the control unit 102 simultaneously performs the product-sum operation processing according to the convolution kernel size on a plurality of points of the calculation target feature planes in response to the shift operations of the reference data shift registers 402a and 402b and the coefficient data shift registers 405a and 405b. Specifically, the control unit 102 performs the product-sum operations for one column (or one row) of the convolution kernel during the operation periods of the reference data shift registers 402a and 402b and the coefficient data shift registers 405a and 405b (during the product-sum operation processing sections illustrated in FIG. 9). The control unit 102 repeats the column-unit operation in the horizontal (or vertical) direction while exchanging the weight coefficient and the reference data to process the two-dimensional convolution operation according to the number of concurrency levels.

In this way, the control unit 102 controls each signal according to the kernel size and the concurrency level to parallelly perform the product-sum operation processing and supply data required for the product-sum operation processing (weight coefficient data and reference data) from the RAM 101.

The Load5 signal is a signal for parallelly loading the result of the parallel product-sum operators into the result shift registers 407a and 407b. Upon completion of the product-sum operation in the parallel processing unit of target feature planes, the control unit 102 outputs 1 as the Load5 and Enable3 signals (the timing is not illustrated in FIG. 9).

When the Load5 signal is 1 and the Enable3 signal is 1, the result shift registers 407a and 407b collectively load the outputs of the parallel product-sum operators 108a and 108b. The control unit 102 enables the Enable3 signal during shift operations of the reference data shift registers 402a and 402b, the coefficient data shift registers 405a and 405b, and the result shift registers 407a and 407b, and shifts out the operation results to be stored in the result shift registers 407a and 407b. The OUTn signals illustrated in FIG. 7 (outputs of the last stage of shift registers) are assumed to be connected to the nonlinear conversion process unit 408. After the conversion process is performed on the shift-out operation results by the nonlinear conversion process unit 408, the control unit 102 stores the operation results in a predetermined address of the RAM 101 based on information of operation result storage destination pointers written in the register group 1202.

As described above, the control unit 102 arbitrates access to the RAM 101 of three processing units: the reference data buffer 105, the coefficient data buffer 403, and the nonlinear conversion process unit 408. The control unit 102 pipelines the product-sum operation processing of the parallel product-sum operators and the accesses to the RAM 101 of the three processing units (the reference data buffer 105, the coefficient data buffer 403, and the nonlinear conversion process unit 408). More specifically, the control unit 102 parallelly performs processing for reading the reference data from the RAM 101 and processing for writing the operation result during the product-sum operation processing period, thus achieving high-speed processing. However, depending on the relation between the concurrency level and the convolution kernel, the control unit 102 may be unable to completely pipeline the access to the RAM 101 during the product-sum operation period (for example, in a case where the concurrency level of the parallel product-sum operators 108a and 108b is high, and the currency level convolution kernel is small).

In this case, the control unit 102 gives priority to the completion of access to the RAM 101 in controlling the Enable1, Enable2, and Enable3 signals and the Latch Enable signal of the cumulative adders 6041 to 604m to delay the start of the product-sum operation processing. For example, when the concurrency level of the parallel product-sum operators 108a and 108b is 12 and the convolution kernel size is 3×3, the number of pieces of reference data required for horizontal operations of the convolution kernel is 12+3−1=14. In this case, if the RAM 101 has a 32-bit data width, a transfer time of 4 cycles (rounding up of 14/4) is required. On the other hand, in the case of the horizontal convolution operation which requires 3 clocks, the reference data transfer time controls the processing time.

Operations specific to the operation circuit according to the present exemplary embodiment will be described below with reference to FIGS. 4A, 4B, 5A, and 5B. FIG. 4A illustrates an operation mode in which one feature plane is parallelly processed by all of the parallel product-sum operators.

The control unit 102 transfers one type of coefficient data in each horizontal direction of the convolution kernel from the RAM 101 to the coefficient data buffer 403. The selector 404 selects data so that the data to be stored in the coefficient data buffer 403 is distributed to the coefficient data shift registers 405a and 405b. More specifically, the coefficient data shift registers 405a and 405b load the same coefficient data from the coefficient data buffer 403 to store the same convolution kernel coefficient stored in the coefficient data buffer 403.

Then, the control unit 102 transfers the reference data in adjoining areas to the reference data buffer registers 405a and 405b. The data to be transferred is the data to be stored in the reference data shift registers 402a and 402b, and is the predetermined number of pieces of reference data in adjoining areas according to the concurrency level of the parallel product-sum operators 108a and 108b, respectively. The predetermined number is calculated by "Size (concurrency level) of data to be parallelly calculated by the parallel product-sum operators 108a and 108b+Horizontal size of kernel−1".

Referring to FIG. 4A, the selector 401 operates so that the data of the upper bits of the output of the reference data buffer 105 is output to the reference data shift register 402a as it is and the data of the lower bits of the output thereof is output to the reference data shift register 402b as it is.

Operations of the selectors 404 and 401 are controlled by a Mode signal generated by the control unit 102. More specifically, the selectors 404 and 401 select and output input data according to the value (1 or 0) of the Mode signal.

When the data has been stored in the reference data shift registers 402a and 402b, the shift operation starts and the parallel product-sum operators 108a and 108b start the product-sum operations in each horizontal direction of the convolution kernel. The control unit 102 repeats the above-described processing for each row of the convolution kernel to enable processing a desired operation result according to the concurrency level. In this operation mode, the control unit 102 parallelly processes the convolution operations at 2×m horizontally adjoining positions.

FIG. 4B schematically illustrates a network configuration and operational relations of the CNN in the operation mode described in FIG. 4A. Reference data areas 410 and 411 required for operations are the data to be stored in the reference data shift registers 402a and 402b, respectively, and are different areas in a reference feature plane. The reference data areas 410 and 411 in the reference feature plane may have an overlap area according to the kernel size.

The convolution kernel 414 is coefficient data to be stored in the coefficient data registers 405a and 405b. Calculation areas 412 and 413 indicate areas in a feature plane calculated through parallel operations by the parallel product-sum operators 108a and 108b, respectively. The calculation areas 412 and 413 each are data at m horizontally adjoining positions. More specifically, the calculation feature plane data at 2×m positions will be parallelly calculated. In the operation mode described in FIG. 4A, the control unit 102 performs raster scanning for each total area of the calculation areas 412 and 413 to calculate a feature plane.

FIG. 5A illustrates an operation mode for parallelly processing two different feature planes with the product-sum operators 108a and 108b.

The control unit 102 transfers the coefficient data in each horizontal direction of the convolution kernel from the RAM 101 to the coefficient data buffer 403. In this case, the control unit 102 stores different coefficient data corresponding to a plurality of feature planes in the coefficient data buffer 403. The selector 404 operates to output two different respective types of coefficients stored in the coefficient data buffer 403 to the coefficient data shift registers 405a and 405b. More specifically, different coefficients corresponding to the calculation feature planes are stored in the coefficient data shift registers 405a and 405b.

Then, the control unit 102 transfers the reference data in the same area to be referenced by two calculation feature planes to the reference data buffer 105. The data to be transferred is the data to be stored in the reference data shift registers 402a and 402b, and is the predetermined number of pieces of reference data in adjoining areas according to the concurrency level of the parallel product-sum operators 108a and 108b. The predetermined number is calculated by "Size of data to be calculated+Horizontal size of kernel−1".

Since the same data is stored in the reference data shift registers 402a and 402b, the size of the data to be stored in the reference data buffer 105 is a half of the size in the operation mode described in FIGS. 4A and 4B. Therefore, data is stored only at the upper bit positions of the reference data buffer 105. The selector 401 operates to output the data stored in the upper bit positions of the reference data buffer 105 to the reference data shift registers 402a and 402b.

When the data has been stored in the reference data shift registers 402a and 402b, shift operations start and the parallel product-sum operators 108a and 108b start the product-sum operations in each horizontal direction of the convolution kernel. Repeating the above-described processing for each row of the convolution kernel enables processing a desired operation result according to the concurrency level. In this operation mode, the control unit 102 parallelly processes the convolution operations at m horizontally adjoining positions on two different feature planes.

Figure 5B:
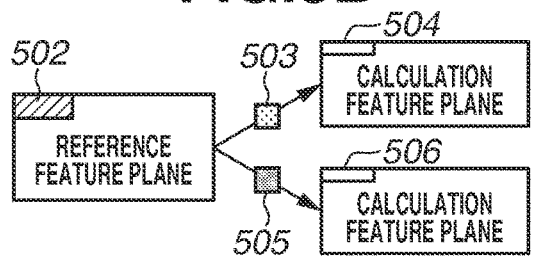
FIG. 5B illustrates another network configuration and operational relations of the CNN according to one or more aspects of the present disclosure.

FIG. 5B schematically illustrates a network configuration and operational relations of the CNN in the operation mode described in FIG. 5A. A reference data area 502 required to calculate two feature planes is the data to be stored in the reference data shift registers 402a and 402b, and is an area on the reference feature plane. Convolution kernels 503 and 505 are different pieces of data to be stored in the coefficient data shift registers 405a and 405b, respectively. Each of calculation areas 504 and 506 on the calculation feature planes to be parallelly operated is a data area at m horizontally adjoining positions. More specifically, the calculation feature plane data at m different positions will be parallelly calculated. The control unit 102 performs raster scanning for each area of the calculation areas 504 and 505 to calculate the two feature planes.

When calculating a plurality of feature planes in the operation mode illustrated in FIGS. 4A and 4B, the control unit 102 transfers the data of the reference feature plane from the RAM 101 to the reference data buffer 105 each time a feature plane is calculated. More specifically, the control unit 102 needs to transfer a data amount which is several times that of the reference target feature plane.

On the other hand, in this operation mode illustrated in FIGS. 5A and 5B, the number of transfers of data of the reference target feature plane can be reduced to share the data of the reference target feature plane for different calculation target feature planes. More specifically, the transfer rate of the reference data required for the operation can be reduced. This reduces the number of cases where the time for transferring data to the reference data buffer 105 controls the overall processing time, making it possible to effectively utilize operation resources (parallel operators). As in the above-described example, when the concurrency level (m×2) of the parallel product-sum operators is 12 and the convolution kernel size is 3×3, the number of pieces of reference data required to perform horizontal operations of the convolution kernel is 12/2+3−1=8. Since one piece of reference data is represented by 8 bits, the reference data to be transferred is 64-bit long. In this case, when the data width of the RAM 101 is 32-bits/cycle, a transfer time of 2 cycles is required. On the other hand, in the case of the horizontal convolution operation which requires 3 clocks, the processing time of the operator controls the overall processing time. More specifically, the capability of the operators is fully utilized.

As illustrated in FIGS. 4A, 4B, 5A, and 5B, in the operation circuit according to the present exemplary embodiment, the control unit 102 changes the reference data and the convolution kernel coefficients to be supplied to the parallel product-sum operators 108a and 108b to control the number of parallel operators to be assigned to the calculation target feature planes.

Figure 10:
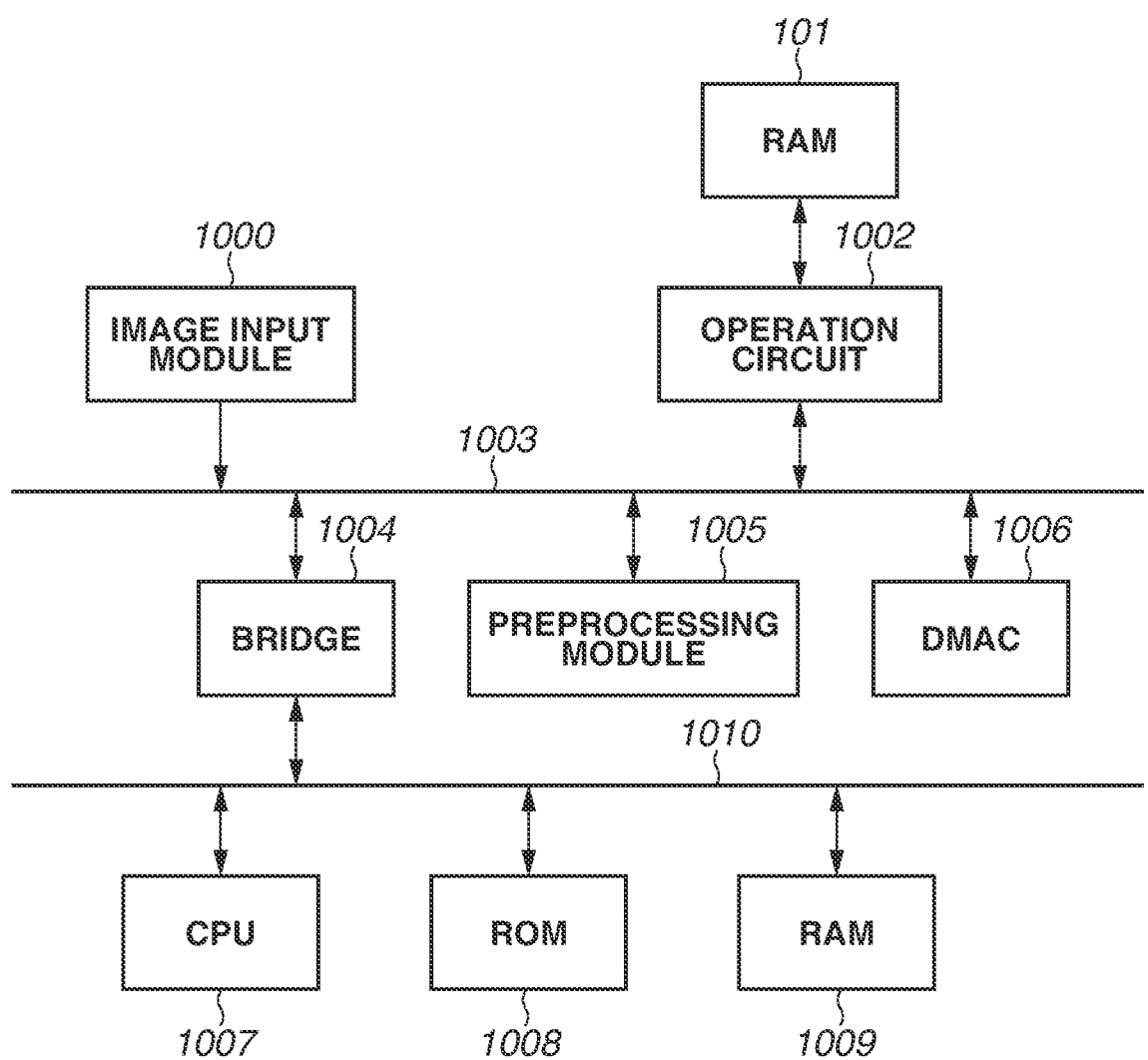
FIG. 10 illustrates a configuration of a pattern recognition apparatus according to one or more aspects of the present disclosure.

FIG. 10 illustrates an example configuration of an image processing apparatus provided with the operation circuit according to the present exemplary embodiment. This image processing apparatus has a function of detecting a specific object from input image data through pattern recognition processing. An operation circuit 1002 illustrated in FIG. 10 is the operation circuit illustrated in FIGS. 1, 4A, 4B, 5A, and 5B.

An image input module 1000 illustrated in FIG. 10 includes a driver circuit for controlling an optical system and a photoelectric conversion device or sensor such as a charge coupled device (CCD) or complementary metal oxide semiconductor (CMOS) sensor, an analog-to-digital (A/D) converter, a signal processing circuit for managing various image corrections, and a frame buffer.

A random access memory (RAM) 101 is used as an operation work buffer of the operation circuit 1002. Data groups equivalent to feature planes of the CNN are stored in the RAM 101.

A direct memory access controller (DMAC) 1006 manages data transfer between each processing unit on the image bus 1003 and a CPU bus 1010. The bridge 1004 provides a bridge function for the image bus 1003 and the CPU bus 1010.

A preprocessing module 1005 performs various kinds of preprocessing for effectively performing pattern recognition processing through the CNN processing. The preprocessing module 1005 performs image data conversion processing such as color conversion processing and contrast correction processing, by hardware.

The CPU 1007 executes a control program to control operations of the entire image processing apparatus. A read only memory (ROM) 1008 stores instructions and parameter data for specifying operations of CPU 1007. A RAM 1009 is a memory required for operations of the CPU 1007. The CPU 1007 can also access the RAM 101 on the image bus 1003 via the bridge 1004.

Figure 11:
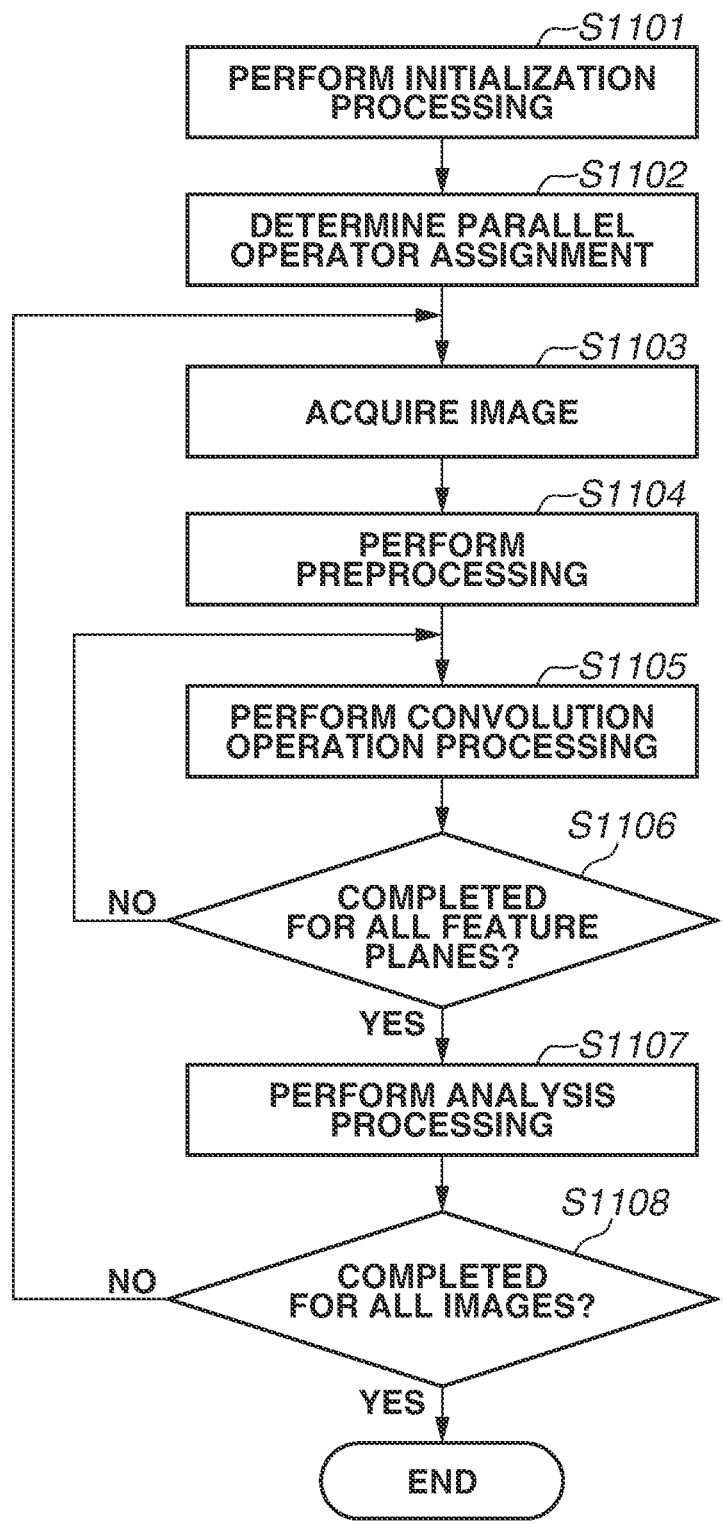
FIG. 11 is a flowchart illustrating processing of the pattern recognition apparatus according to one or more aspects of the present disclosure.

FIG. 11 is a flowchart illustrating operations of the image processing apparatus according to the present exemplary embodiment. The flowchart is implemented when the CPU 1007 executes a control program. In step S1101, before starting the pattern recognition processing, the CPU 1007 performs various kinds of initialization processing. The CPU 1007 transfers weight coefficients required for operations of the operation circuit 1002 from the ROM 1008 to the RAM 101 and at the same time performs various setting for defining operations of the operation circuit 1002, i.e., the network configuration of the CNN. Specifically, the CPU 1007 sets predetermined values to a plurality of operation registers existing in the control unit 102 of the operation circuit 1002. Likewise, the CPU 1007 writes values required for operations to registers such as the preprocessing module 1005 and the like.

In step S1102, the CPU 1007 determines the assignment of the parallel operators when calculating each feature plane.

In this case, the CPU 1007 sets the number of parallel operators to be assigned to feature planes according to the network configuration of the CNN, the performance of data transfer from the RAM 101 to operators, operation target areas, and other operation conditions. For example, the CPU 1007 sets the number according to combination relations between the reference feature plane and the calculation feature planes. Alternatively, the CPU 1007 determines the number based on the relation between the time of transferring the reference data to be stored in the RAM 101 to the operators and the processing cycles (processing time) of the operators.

Upon completion of the initialization processing in step S1101 and the assignment of the parallel operators in step S1102, the CPU 1007 starts a series of object recognition operations.

In step S1103, the image input module 1000 converts a signal output by an imaging sensor into digital data and stores the digital data in a frame buffer (not illustrated, included in the image input module 1000) on a frame basis.

When the data has been stored in the frame buffer, then in step S1104, the preprocessing module 1005 starts image conversion processing based on a predetermined signal. The preprocessing module 1005 extracts luminance data from the image data on the above-described frame buffer and performs contrast correction processing on the luminance data.

When extracting luminance data, the preprocessing module 1005 generates luminance data based on red, green, and blue (RGB) image data through general linear conversion processing. As a contrast correction method, the preprocessing module 1005 applies a generally known contrast correction processing to emphasize the contrast. The preprocessing module 1005 stores the luminance data having undergone the contrast correction processing in the RAM 101 as an image for detection.

Upon completion of the preprocessing to image data for one frame, the preprocessing module 1005 enables a completion signal (not illustrated). In step S1105, the operation circuit 1002 activates the operation circuit 1002 based on the completion signal to start object detection processing based on the CNN. In step S1106, upon completion of the calculation of feature planes for the last layer, the operation circuit 1002 generates a completion interrupt to the CPU 1007. In step S1107, upon reception of a notification (interrupt) of the end of processing of the operation circuit 1002, the CPU 1007 analyzes feature planes of the last layer and determines the positions and attributes of objects in the image. Upon completion of the analysis processing in step S1107, then in step S1108, the CPU 1007 continues the processing for the image of the following frame.

According to the present exemplary embodiment, it becomes possible to select the number of parallel operators to be assigned to the calculation target feature planes through simple control. This makes it possible to efficiently process diverse networks with a high concurrency level, thus reducing the overall processing time.

Although the present exemplary embodiment has been described above centering on a case where two-dimensional convolution operations are processed by parallel operators, operations are not limited to the convolution operations.

Although, in the present exemplary embodiment, the CNN processing is performed on two-dimensional data (image data), the present exemplary embodiment is also applicable to the CNN processing on one-dimensional data such as sound data and three-dimensional data including changes in a time direction.

Although the present exemplary embodiment has been described above centering on a case where the present exemplary embodiment is applied to the CNN processing, the present exemplary embodiment is not limited thereto. The present exemplary embodiment is applicable to various kinds of processing represented by hierarchical combination relations in operation processing. For example, the present exemplary embodiment is applicable to other hierarchical processes such as Restricted Boltzmann Machines and Recursive Neural Network.

Although the first exemplary embodiment has been described above centering on a case where two different methods for assigning parallel operators are changed, the second exemplary embodiment will be described below centering on an example configuration for implementing an assignment method having a higher degree-of-freedom.

Figure 13A:
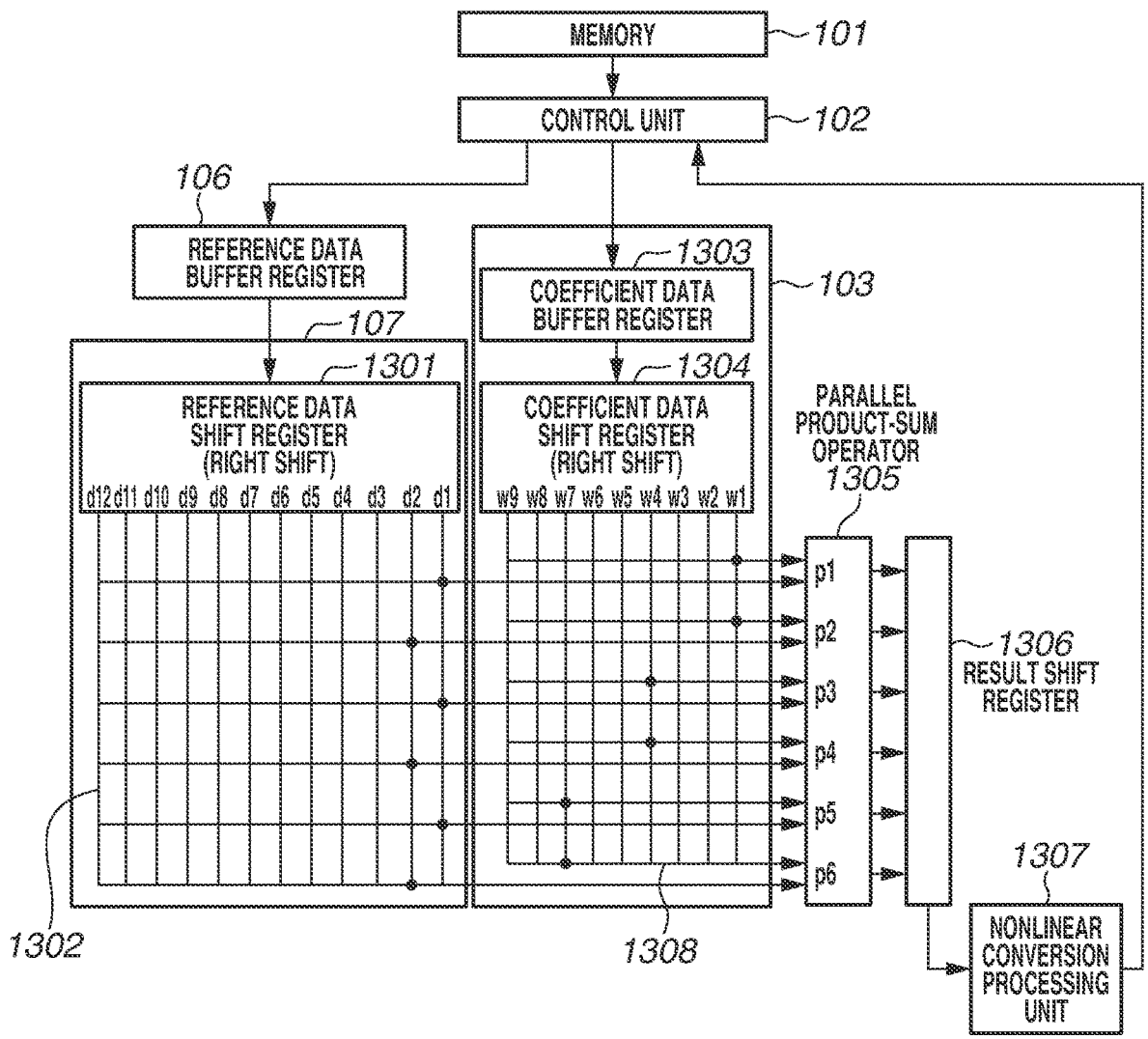
FIG. 13A illustrates an example configuration and example operations according to one or more aspects of the present disclosure.

FIG. 13A illustrates a configuration of an operation circuit according to the present exemplary embodiment. The RAM 101 and the control unit 102 are similar to those in the operation circuit illustrated in FIG. 1. A reference data buffer register 106 is equivalent to the reference data holding unit 105 illustrated in FIG. 1, and is configured similarly to the registers illustrated in FIGS. 4A, 4B, 5A, and 5B. The first data supply unit 107 according to the present exemplary embodiment includes a reference data shift register 1301 and a crossbar switch 1302. The first data supply unit 107 may include the reference data buffer register 106 and the reference data shift register 1301, and the crossbar switch 1302 may configure a path control unit. This path control unit controls the path between the outputs of the first data supply unit 107 and the inputs of the parallel operators. The reference data shift register 1301 is assumed to include 12 registers d1 to d12. A second data supply unit 103 according to the present exemplary embodiment includes a coefficient data buffer register 1303, a coefficient data shift register 1304, and a crossbar switch 1308. The second data supply unit 103 may include the coefficient data buffer register 1303 and the coefficient data shift register 1304, and the crossbar switch 1308 may configure a path control unit. This path control unit controls the path between the outputs of the second data supply unit 103 and the inputs of the parallel operators.

A parallel product-sum operator 1305 in this case includes 6 product-sum operators p1 to p6. The outputs of the crossbar switches 1302 and 1308 are connected to the two inputs of each parallel product-sum operator. A result shift register 1306 latches the outputs of the parallel product-sum operator 1305 (operation result) at a predetermined timing, and sequentially outputs the operation result to a nonlinear conversion process unit 1307. The obtained operation result is stored in the RAM 101 via the control unit 102. The crossbar switches 1302 and 1308 defines the path between the reference data shift register 1301 and the parallel product-sum operator 1305, and the path between the coefficient data shift register 1304 and the parallel product-sum operator 1305, respectively.

The present exemplary embodiment will be described below centering only on differences from the first exemplary embodiment. Operations according to the present exemplary embodiment differ from operations according to the first exemplary embodiment only in the method for supplying data via the crossbar switches. Various operation timings are similar to operation timings in the configurations illustrated in FIGS. 4A, 4B, 5A, and 5B. More specifically, the operation timings of the reference data buffer register 106, the coefficient data buffer 1303, the reference data shift register 1301, the coefficient data shift register 1304, and the parallel product-sum operator 1305 by the control unit 102 are similar to operation timings illustrated in FIG. 9.

Before starting the convolution operation processing, the control unit 102 performs setting of the crossbar switches 1302 and 1308. This setting enables determining the product-sum operators to be assigned to the calculation target feature planes.

Figure 13B:
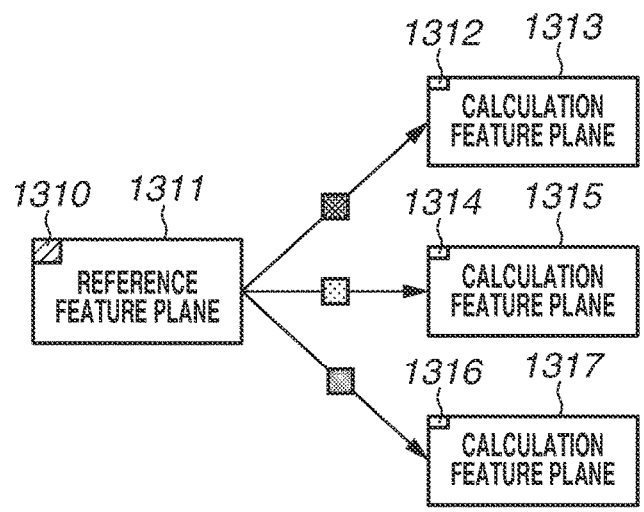
FIG. 13B illustrates a network configuration and operational relations of the CNN according to one or more aspects of the present disclosure.

FIG. 13B schematically illustrates a network configuration of the CNN and operational relations when parallelly processing three different feature planes. Reference data 1310 indicates the reference data position of a reference feature plane 1311 required for operations. Calculation data 1312, 1314, and 1316 indicate the data positions of the feature planes to be simultaneously calculated by the parallel product-sum operator 1305.

The parallel product-sum operator 1305 calculates three feature planes 1313, 1315, and 1317 by performing processing while raster-scanning the areas of the calculation data 1312, 1314, and 1316.

In the crossbar switches 1302 and 1308, black dot positions indicate combining points. For example, an output d1 of the reference data shift register 1301 and an output w1 of the coefficient data shift register 1304 will be input to the product-sum operator p1. Referring to the example illustrated in FIGS. 13A and 13B, the parallel product-sum operations are divided into three different groups. The three groups include a group of p1 and p2, a group of p3 and p4, and a group of p5 and p6. In this case, the concurrency level of each group (m) is 2. More specifically, each of the calculation feature planes 1313, 1315, and 1317 is calculated with a concurrency level of 2.

According to the setting of the crossbar switch 1302, reference data common to each group (output d1 or d2) is parallelly input to each product-sum operator of the parallel product-sum operator 1305. In other words, the outputs d1 and d2 are input to the product-sum operators in each group. On the other hand, outputs w1, w4, and w7 as different coefficients are parallelly input to the product-sum operators of each group, and common coefficient data d1 and d2 are sequentially input to the product-sum operators in each group.

FIGS. 13A and 13B illustrates a setting when the horizontal kernel size of the convolution kernel is 3. Three coefficients c1, c2, and c3 prestored at corresponding positions in the outputs w1, w2, and w3 of the coefficient data shift register 1304 in the initial state before starting the shift operation are sequentially input to the product-sum operators p1 and p2 in this order via the output w1 of the coefficient data shift register 1304. Three pieces of reference data i1, i2, and i3 prestored at corresponding positions in the outputs d1, d2, and d3 of the reference data shift register 1301, respectively, in the initial state before starting the shift operation are sequentially input to the product-sum operator p1. Likewise, three pieces of reference data i2, i3, and i4 prestored at corresponding positions in the outputs d2, d3, and d4 of the reference data shift register 1301, respectively, are sequentially input to the product-sum operator p2. Focusing on the product-sum operator p1, a product-sum operation result of c1×i1+c2×i2+c3×i3 is obtained in 3 clocks (shift operations of the reference data shift register 1301 and the coefficient data shift register 1304). Likewise, coefficient data prestored in w4, w5, and w6 of the coefficient data shift register 1304 are sequentially input to the product-sum operators p3 and p4. Coefficient data stored in w7, w8, and w9 of the coefficient data shift register 1304 will be sequentially input to the product-sum operators p5 and p6. On the other hand, common reference data is input to each group.

The parallel product-sum operator 1305 processes the convolution operations of the three groups through a shift operation in which the reference data shift register 1301 and the coefficient data shift register 1304 operate in synchronization with each other. A two-dimensional convolution operation result can be obtained by repeating the above-described horizontal convolution operations in the vertical direction. Upon completion of predetermined convolution operations, the parallel product-sum operator 1305 transfers the result to the result shift register 1306 which then sequentially outputs the result to the nonlinear conversion process unit 1307. The control unit 102 stores the obtained result in a predetermined area of the RAM 101. The obtained operation result includes the calculation data 1312, 1314, and 1316 at corresponding positions on the calculation feature planes 1313, 1315, and 1317, respectively. Performing the raster scan processing on the parallel processing unit operations enables calculating the calculation feature planes 1313, 1315, and 1317.

Figure 14A:
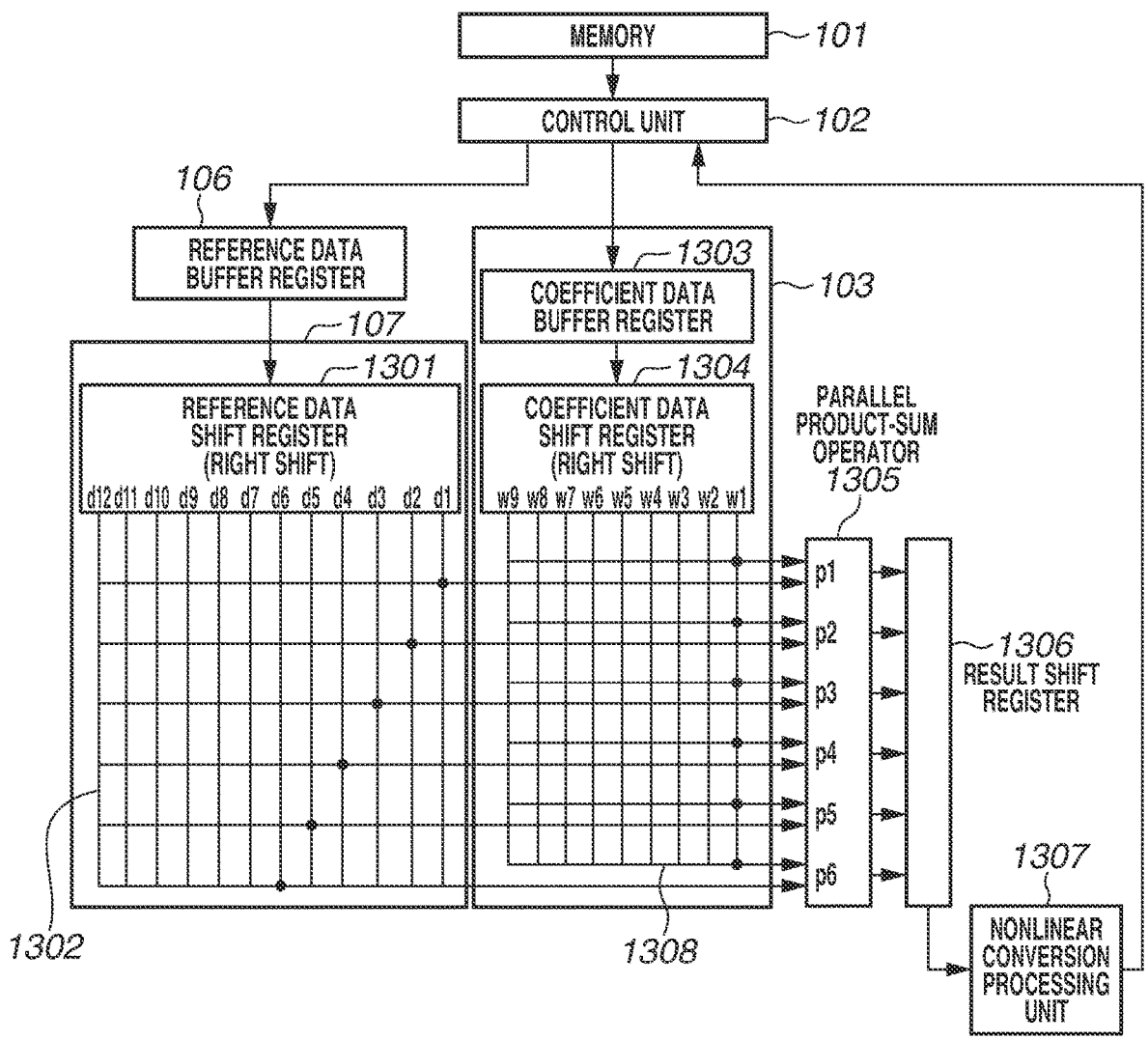
FIG. 14A illustrates another example configuration and example operations according to one or more aspects of the present disclosure.
Figure 14B:
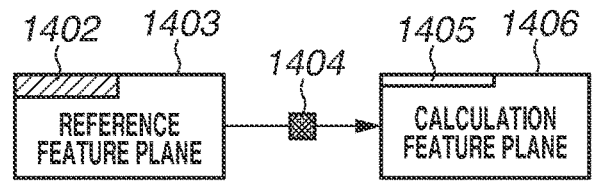
FIG. 14B illustrates another network configuration and operational relations of the CNN according to one or more aspects of the present disclosure.

The apparatus illustrated in FIG. 14A is similar to the apparatus illustrated in FIG. 13A except in the settings of the crossbar switches 1302 and 1308. Similar to FIGS. 13A and 13B, black dots indicate combining points. In this case, the control unit 102 supplies different reference data to all of the product-sum operators p1 to p6 of the parallel product-sum operator 1305. Specifically, the control unit 102 parallelly supplies the outputs d1 to d6 of the reference data shift register 1301 to the product-sum operators p1 to p6, respectively. On the other hand, the control unit 102 sequentially supplies the same coefficient data (for example, the output w1) to all of the product-sum operators p1 to p6 of the parallel product-sum operator 1305. More specifically, in the configuration illustrated in FIG. 14A, the control unit 102 controls all of the product-sum operators p1 to p6 as one group and parallelly calculates the positions of the product-sum operators on one feature plane with a concurrency level of 6. FIG. 14B schematically illustrates a network configuration of the calculation target CNN and the calculation situation. The control unit 102 parallelly calculates the data of a calculation area 1405 including a plurality of positions in one calculation feature plane 1406. A reference area 1402 indicates a data area in a reference feature plane 1403 required for the convolution operation of the calculation area 1405. A convolution kernel 1404 is coefficient data to be supplied to the parallel product-sum operator 1305 via the coefficient data shift register 1304.

Similar to the apparatus illustrated in FIG. 13A, the apparatus illustrated in FIG. 14A is assumed to have a horizontal size of the convolution kernel of 3. The product-sum operators p1 to p6 perform the convolution operations at six horizontally adjoining positions on the same feature plane in 3 clocks through shift operations in which the reference data shift register 1301 and the coefficient data shift register 1304 operate in synchronization with each other. The outputs of the product-sum operators p1 to p6 correspond to results at horizontally adjoining positions of the calculation feature plane. For example, focusing on the product-sum operator p4, the reference data prestored at corresponding positions of the outputs d4 to d6 of the reference data shift register 1301 before starting the shift operation of the reference data shift register 1301 is assumed to be reference data i4 to i6. The coefficient data prestored at corresponding positions of the outputs w1, w2, and w3 of the coefficient data shift register 1304 before starting the shift operation of the coefficient data shift register 1304 is assumed to be coefficient data c1 to c3. At the first clock, c1×i4 is cumulated. At the second clock, c1×i4+c2×i5 is cumulated. At the third clock, c1×i4+c2×i5+c3×i6 is cumulated. The product-sum operators p1 to p6 parallelly perform the convolution operations at a plurality of calculation feature plane positions with reference to the reference data at different positions. The obtained result is stored in a predetermined area of the RAM 101 via the result shift register 1306 and the nonlinear conversion process unit 1307.

FIGS. 13A and 13B illustrate a case where three different feature planes are parallelly calculated, and FIGS. 14A and 14B illustrate a case where one feature plane is parallelly operated. However, the present exemplary embodiment is not limited thereto and can be applied to various configurations depending on the settings of the crossbar switches 1302 and 1308. FIGS. 13A, 13B, 14A, and 14B illustrate cases where complete crossbar switches are provided as a method for changing the path. However, in consideration of the processing target network and circuit scale, a partial crossbar configuration may be applicable. The method for grouping data supply units is not limited to the methods illustrated in FIGS. 4A, 4B, 5A, 5B, 13A, 13B, 14A, and 14B, and other configurations may be applicable.

As illustrated in FIGS. 13A, 13B, 14A, and 14B, the present exemplary embodiment makes it possible to arbitrarily set groups of data to be supplied to the parallel product-sum operators based on the settings of the crossbar switches 1302 and 1308. Thus, operations can be performed by selecting a more efficient processing configuration according to the network configuration and operating conditions of the CNN.

Although the first exemplary embodiment has been described above centering on a case where operators are distributed to two different feature planes, the present exemplary embodiment will be described below centering on a case where methods for assigning operators (when operating one feature plane) are switched. The configuration of the operation circuit according to the present exemplary embodiment is similar to the configuration of the operation circuit according to the first exemplary embodiment, and descriptions thereof will be omitted.

Figure 15A:
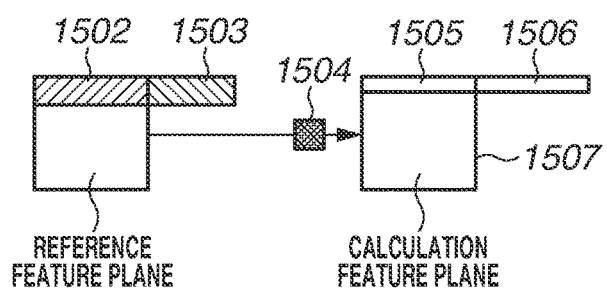
FIGS. 15A and 15B illustrate example calculations of feature planes according to one or more aspects of the present disclosure.
Figure 15B:
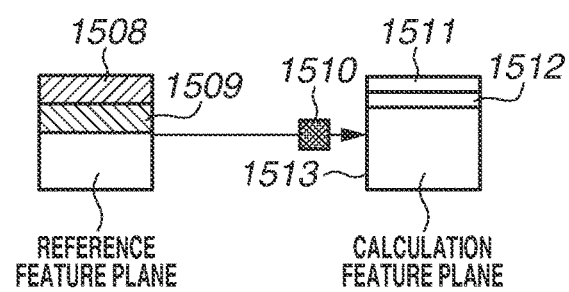

FIGS. 15A and 15B illustrate examples of network configurations of a CNN to be processed by the present exemplary embodiment. Similar to the example illustrated in FIG. 4B, FIG. 15A illustrates an example for parallelly processing the data of a calculation feature plane at horizontally adjoining positions on one feature plane. The present exemplary embodiment differs from the case illustrated in FIG. 4B in that the horizontal size of the processing target reference feature plane is small. Examples of such a case include a case where the concurrency level is high when processing a partial area including a predetermined feature in an image. If the horizontal size of the image is not a multiple of the number of parallel product-sum operators 108a and 108b, a similar problem arises at the right end of the image. Calculation areas 1505 and 1506 illustrated in FIG. 15A indicate data positions of the calculation target feature planes to be simultaneously calculated. If the size of the calculation feature plane 1507 is small, processing by the operators of the group for calculating the calculation area 1506 will become useless. FIG. 15B illustrates an example case where the positions of calculation feature planes to be simultaneously operated have been changed. Referring to FIG. 15B, the operators of the group for calculating the position of the calculation area 1506 calculate the position of a calculation area 1512 instead of calculating the position of the calculation area 1506.

More specifically, the operators parallelly calculate calculation areas 1511 and 1512 instead of calculating the two calculation areas 1505 and 1506 illustrated in FIG. 15A. In this case, all of the product-sum operators in the parallel product-sum operator 1305 can be operated in processing. In example processing illustrated in FIG. 15B, the control unit 102 supplies the reference data equivalent to the position of reference area 1509 to the reference data shift register 402b illustrated in FIG. 4A. Reference areas 1508 and 1509 may have an overlapped portion according to the size of the convolution kernel. The supply of the coefficient data as convolution kernels 1504 and 1510 is similar to the supply in the case illustrated in FIGS. 4A and 4B.

Simply changing the data to be supplied to the reference data supply units in this way enables changing the calculation areas to be parallelly calculated in a plurality of groups, thus improving parallelization efficiency. The above-described method for changing the calculation areas to be parallelly calculated is similarly applicable to the configurations illustrated in FIGS. 14A and 15A. The configurations illustrated in FIGS. 4A, 5A, 13A, and 14A differ only in the contents of reference data transfer by the control unit 102.

According to the present exemplary embodiment, it is possible to efficiently operate parallel operators by calculating, for each predetermined group, a calculation area to be calculated by the parallel operators according to the shape (size) of the calculation area in calculation processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. A data processing apparatus comprising:
   a storage unit configured to store reference data and filter coefficient data of a filter operation
   a predetermined number of operators configured to perform the filter operation on the reference data with the filter coefficient data in parallel;
   a reference data supply unit configured to hold the predetermined number of groups of reference data transferred from the storage unit, and supply the predetermined number of groups of transferred reference data to the predetermined number of operators in parallel;
   a coefficient data supply unit configured to hold the predetermined number of groups of filter coefficient data transferred from the storage unit, and supply one piece of the filter coefficient data to the predetermined number of operators in parallel; and
   a control unit configured to control the reference data supply unit and the coefficient data supply unit so that each operator of the predetermined number of operators is supplied with reference data in one of the predetermined number of groups of reference data corresponding to that operator, and one piece of the filter coefficient data in one of the predetermined number of groups of filter coefficient data corresponding to that operator, and that each operator of the predetermined number of operators performs the filter operation on the reference data in the one group corresponding to that operator with the one piece of the filter coefficient data in the one group corresponding to that operator.

2. The data processing apparatus according to claim 1, wherein the coefficient data supply unit comprises a coefficient data selection unit configured to select whether the coefficient data supply unit supplies independent groups of filter coefficient data or a common group of filter coefficient data to the predetermined number of operators.

3. The data processing apparatus according to claim 2, wherein the coefficient data supply unit comprises:
a coefficient data buffer configured to store one or more groups of the filter coefficient data transferred from the storage unit; and
a predetermined number of coefficient data shift register each configured to load a selected one group of the filter coefficient data from the coefficient data buffer and supply the selected one group of the filter coefficient data to a corresponding one of the predetermined number of operators.

4. The data processing apparatus according to claim 1, wherein the reference data supply unit comprises a reference data selection unit configured to select whether the reference data supply unit supplies independent groups of reference data or a common group of reference data to the predetermined number of operators.

5. The data processing apparatus according to claim 4, wherein the reference data supply unit comprises:
a reference data buffer configured to store one or more groups of the reference data transferred from the storage unit; and
a predetermined number of reference data shift register each configured to load a selected one group of the reference data from the reference data buffer and supply the selected one group of the reference data to a corresponding one of the predetermined number of operators.

6. The data processing apparatus according to claim 1, further comprising a path control unit configured to control a path for supplying the filter coefficient data from the coefficient data supply unit to the predetermined number of operators.

7. The data processing apparatus according to claim 6, wherein the path control unit uses crossbar switches.

8. The data processing apparatus according to claim 1, wherein the filter operation is a convolution operation performed on the reference data and the coefficient data of the filters.

9. The data processing apparatus according to claim 1, further comprising:
a predetermined number of result shift registers configured to hold output data of the predetermined number of operators; and
a conversion unit configured to perform nonlinear conversion on the output data of the shift registers.

10. The data processing apparatus according to claim 9, wherein the control unit instructs the storage unit to store the output data of the shift registers or output data of the conversion unit.

11. The data processing apparatus according to claim 1, wherein the reference data is two-dimensional data, and
wherein, based on a size of the reference data, the predetermined number of operators sequentially performs the filter operation on the reference data arranged in a horizontal or vertical direction of the two-dimensional data.

12. The data processing apparatus according to claim 1, wherein the filter operation is an operation represented by hierarchical combination relations between a plurality of data groups of a convolutional neural network.

13. The data processing apparatus according to claim 12, wherein the control unit controls parallel processing by the predetermined number of operators based on the hierarchical combination relations.

14. The data processing apparatus according to claim 1, wherein the reference data includes image data, and
wherein the predetermined number of operators perform operations for pattern recognition on the image data.

15. A method for controlling a data processing apparatus having a storage unit configured to store reference data and coefficient data of a filter operation, the method comprising:
holding a predetermined number of groups of reference data transferred from the storage unit, and supplying the predetermined number of groups of transferred reference data to a predetermined number of operators via a reference data supply unit in parallel;
holding the predetermined number of groups of filter coefficient data transferred from the storage unit, and supplying one piece of the filter coefficient data to the predetermined number of operators via a coefficient data supply unit in parallel;
performing the filter operation on the reference data with the filter coefficient data by using a predetermined number of operators in parallel; and
controlling the reference data supply unit and the coefficient data supply unit so that each operator of the predetermined number of operators is supplied with reference data in one of the predetermined number of groups of reference data corresponding to that operator, and one piece of the filter coefficient data in one of the predetermined number of groups of filter coefficient data corresponding to that operator, and that each operator of the predetermined number of operators performs the filter operation on the reference data in the one group corresponding to that operator with the one piece of the filter coefficient data in the one group corresponding to that operator.

16. A non-transitory computer-readable storage medium storing a program for causing a computer having a storage unit configured to store reference data and filter coefficient data of a filter operation to function as:
a predetermined number of operators configured to perform the filter operation on the reference data with the filter coefficient data in parallel;
a reference data supply unit configured to hold the predetermined number of groups of reference data transferred from the storage unit, and supply the predetermined number of groups of transferred reference data to the predetermined number of operators in parallel;
a coefficient data supply unit configured to hold the predetermined number of groups of filter coefficient data transferred from the storage unit, and supply one piece of the filter coefficient data to the predetermined number of operators in parallel; and
a control unit configured to control the reference data supply unit and the coefficient data supply unit so that each operator of the predetermined number of operators is supplied with reference data in one of the predetermined number of groups of reference data corresponding to that operator, and one piece of the filter coefficient data in one of the predetermined number of groups of filter coefficient data corresponding to that operator, and that each operator of the predetermined number of operators performs the filter operation on the reference data in the one group corresponding to that operator with the one piece of the filter coefficient data in the one group corresponding to that operator.

* * * * *